(12) United States Patent
Takamura et al.

(10) Patent No.: US 9,154,999 B2
(45) Date of Patent: Oct. 6, 2015

(54) WIRELESS COMMUNICATION APPARATUS, COMMUNICATION SYSTEM, AND INFORMATION PROCESSING METHOD

(75) Inventors: Kazuhisa Takamura, Chiba (JP);
Shinichiro Tsuda, Kanagawa (JP);
Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 13/428,931

(22) Filed: Mar. 23, 2012

(65) Prior Publication Data
US 2012/0250621 A1    Oct. 4, 2012

(30) Foreign Application Priority Data

Mar. 30, 2011 (JP) ................ 2011-073851

(51) Int. Cl.
*H04W 4/00* (2009.01)
*H04W 28/26* (2009.01)
*H04W 80/04* (2009.01)
*H04W 72/04* (2009.01)

(52) U.S. Cl.
CPC .............. *H04W 28/26* (2013.01); *H04W 72/04* (2013.01); *H04W 80/04* (2013.01)

(58) Field of Classification Search
None
See application file for complete search history.

(56) References Cited

FOREIGN PATENT DOCUMENTS

| JP | 10-145833 A | 5/1998 |
|----|-------------|--------|
| JP | 2004-180204 A | 6/2004 |
| JP | 2005-033473 | 2/2005 |
| JP | 2007-306318 | 11/2007 |
| JP | 2002-232928 | 3/2011 |

OTHER PUBLICATIONS

Japanese Office Action issued on Jun. 2, 2015 in patent application No. 2011-073851.

*Primary Examiner* — Afshawn Towfighi
(74) *Attorney, Agent, or Firm* — Sony Corporation

(57) ABSTRACT

A wireless communication apparatus includes: a communication control unit performing a connection rights reservation request for wirelessly connecting to a predetermined network in a specific region in a specific time band; and a control unit performing control for setting the connection rights based on the setting information according to the reservation request.

15 Claims, 24 Drawing Sheets

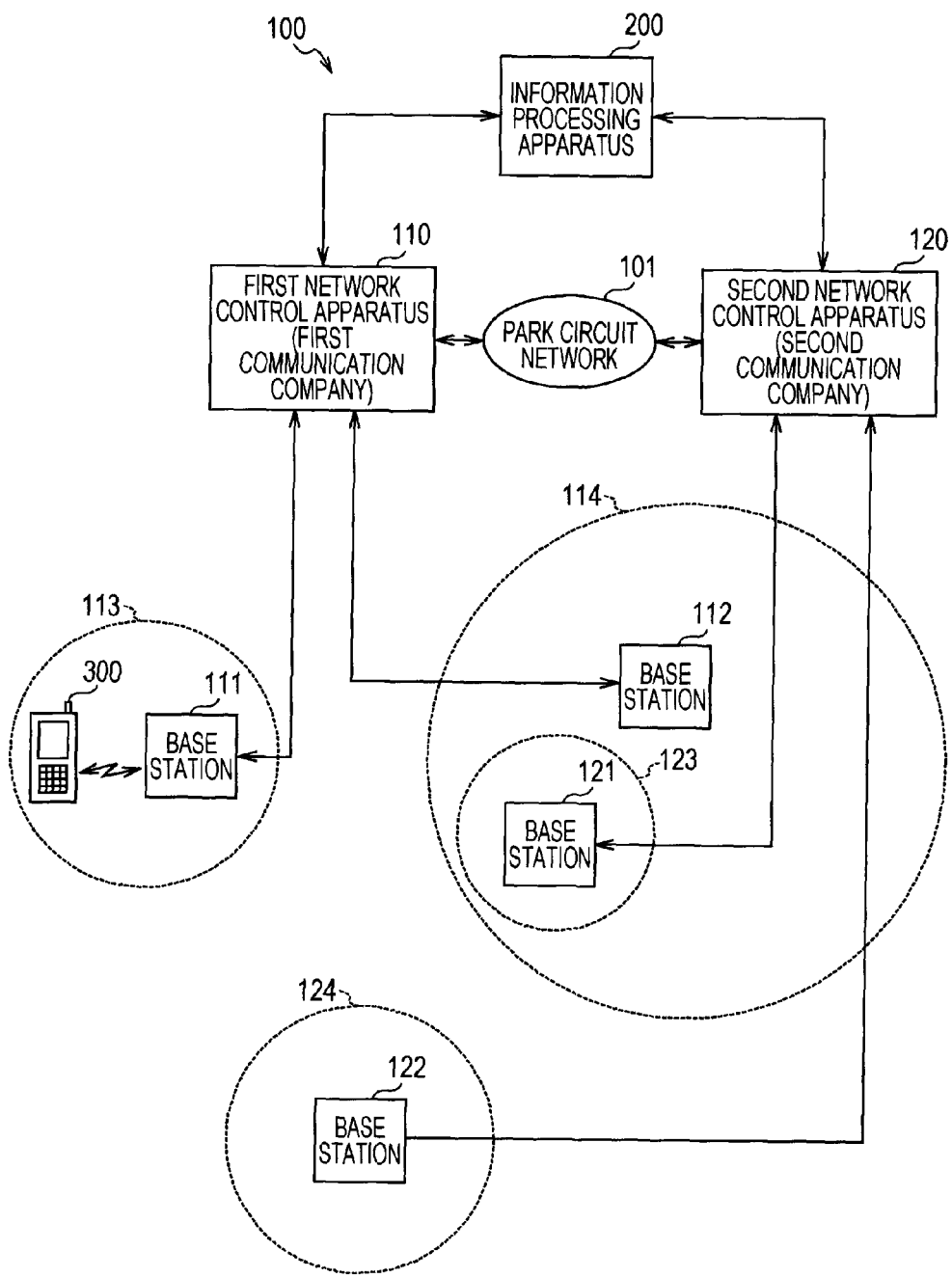

BASE STATION (BASE STATION ID: AP003)
BASE STATION (BASE STATION ID: AP002)
BASE STATION (BASE STATION ID: AP001)

| SCHEDULE INFORMATION | | RESERVATION TERMINAL ID | | | | |
|---|---|---|---|---|---|---|
| | | 1 | 2 | 3 | 4 | 5 |
| 4/1 (FRI) | | ⋮ | ⋮ | ⋮ | ⋮ | ⋮ |
| 4/2 (SAT) | 0:00-0:30 | T011 | T015 | T019 | T021 | |
| | 0:30-1:00 | | | | | |
| | ⋮ | | | | | |
| | 10:00-10:30 | T021 | T035 | T045 | — | — |
| | 11:30-12:00 | | | | | |
| | 12:00-12:30 | | | | | |
| | 12:30-13:00 | | | | | |
| | 13:00-13:30 | | | | | |
| | 13:30-14:00 | | | | | |
| | 14:00-14:30 | T065 | T087 | T089 | T091 | T041 |
| | ⋮ | | | | | |
| | 23:00-23:30 | | | | | |
| | 23:30-24:00 | | | | | |
| 4/3 (SUN) | | ⋮ | ⋮ | ⋮ | ⋮ | ⋮ |
| ⋮ | ⋮ | ⋮ | ⋮ | ⋮ | ⋮ | ⋮ |

261 — SCHEDULE INFORMATION
262 — RESERVATION TERMINAL ID

FIG. 5

| USER ID | BASE STATION ID | COMPANY ID | CANCELLATION WAITING LIST RESERVATION SCHEDULE (d/s/ms) | START SCHEDULE (d/s/ms) | FINISH SCHEDULE (d/s/ms) | TERMINAL ID | COMMUNICATION FORMAT |
|---|---|---|---|---|---|---|---|
| U001 | AP001 | DDM | — | 04/02/2011 12:00-00:00 | 04/02/2011 13:30-00:00 | T001 | HSPA |
| U002 | AP002 | ABC | 03/22/2011 12:00-00:00 | 04/02/2011 10:00-00:00 | 04/02/2011 15:00-00:00 | T002 | LTE |
| U003 | AP003 | SBK | — | 04/02/2011 13:00-00:00 | 04/02/2011 17:00-00:00 | T003 | HSPA |
| U004 | AP004 | NNN | 03/21/2011 15:32-00:00 | 04/02/2011 09:00-00:00 | 04/02/2011 10:00-00:00 | T004 | 11n |

IT IS POSSIBLE TO MAKE A RESERVATION ACCORDING TO THE INFORMATION BELOW TO CONFIRM THE RESERVATION, PLEASE PRESS THE REGISTER BUTTON TO CORRECT PART OF THE INFORMATION, PLEASE PRESS THE CORRECTION BUTTON

531
PLACE

SHINAGAWA-KU, TOKYO ○○ ×-▲-□ AROUND 1km FROM

532
TIME

04/02/2011 12:00
FROM

04/02/2011 13:30
UNTIL

533
COMMUNICATION EXPENSES 3,000 YEN OR LESS

534 REGISTER   535 CORRECT   536 CANCELLATION FEE

FIG. 10

537
THE CANCELLATION FEE FOR THE PRESENT
RESERVATION IS AS FOLLOWS

UP TO 14 DAYS BEFORE (0%) — 0 YEN

UP TO 7 DAYS BEFORE (33.3%) — 100 YEN

UP TO 3 DAYS BEFORE (66.6%) — 200 YEN

LESS THAN 3 DAYS BEFORE (100%) — 300 YEN

538
RETURN

IT WAS NOT POSSIBLE TO MAKE A RESERVATION UNDER
THE DESIRED CONDITIONS
WOULD YOU LIKE TO GO ON THE CANCELLATION WAITING LIST
WITH THE FOLLOWING CONDITIONS?

541

PLACE

SHINAGAWA-KU, TOKYO ○○ ×-▲-□

AROUND 1km FROM

THERE IS A RESERVATION ESTIMATION OUTSIDE RANGE

542

TIME

04/02/2011 12:00
FROM

04/02/2011 13:15
UNTIL

543

PLAN 3G (COMPANY UNDECIDED: MAX 7M) + WIRELESS LAN
3,000 YEN + ESTIMATED RESERVATION (MAX 300 YEN)

544
GO ON CANCELLATION
WAITING LIST

545
FINISH

A RESERVATION HAS BEEN MADE WITH THE INFORMATION BELOW
IF YOU ARE NOT PRESENT AT THE TIME AND PLACE BELOW,
THE RESERVATION WILL BE CANCELLED

551 —

RESERVATION PLACE

SHINAGAWA-KU, TOKYO ○○ ×-▲-□ AROUND 1km FROM

552 —

RESERVATION TIME

04/02/2011 12:00

FROM

04/02/2011 13:30

UNTIL

553 —

RESERVATION COMMUNICATION EXPENSES

3,000 YEN OR LESS

554 — RETURN

555 — DETAILS

WIRELESS COMMUNICATION APPARATUS, COMMUNICATION SYSTEM, AND INFORMATION PROCESSING METHOD

BACKGROUND

The present disclosure relates to a wireless communication apparatus, specifically, to a wireless communication apparatus performing wireless communication, and a communication system provided therewith and information processing method.

Hitherto, wireless communication apparatuses connected to a network such as a public wireless network are widely used. Further, in order that the wireless communication apparatus may be used at the destination of the user who owns the wireless communication apparatus, base stations for the wireless communication apparatus to connect to are installed at various regions. Further, when the wireless communication apparatus is moving, it is possible for the moving wireless communication apparatus to continue communication by performing a handover.

For example, a communication system has been proposed which determines the base station candidate in the movement direction to which the next handover is to be performed and performs a handover based on the prediction result (movement direction of the wireless communication apparatus) based on position data obtained by the wireless communication apparatus (for example, Japanese Unexamined Patent Application Publication No. 2002-232928).

SUMMARY

According to the related art described above, it is possible to use the wireless communication apparatus at the destination of the user without mistakenly performing a handover to a base station of a cell which is not in the original movement direction.

Here, for example, in a location where there are a large number of cherry trees, it may be assumed that large numbers of people will gather in the spring season. In this manner, when a large number of people gather in a specific area, it may be assumed that traffic will be increased in the local area. For this reason, even in a state where it is possible to use the wireless communication apparatus, there is a concern that a user may not receive a satisfactory wireless connection service or obtain a sufficient communication rate.

It is desirable to provide an appropriate wireless connection service at a location and timing desired by a user.

According to a first embodiment of the present disclosure, there is provided a wireless communication apparatus program and information processing method include: a communication control unit performing a reservation request for connection rights in order to wirelessly connect to a predetermined network in a specific region in a specific time band; and a control unit performing control setting the above connection rights based on the setting information according to the above reservation request, as well as a program causing a computer to execute the above method. In this manner, the connection rights reservation request is made, and an action of setting the connection rights based on the setting information according to the reservation request is carried out.

Moreover, in the first embodiment, the connection rights are for connecting to the predetermined network by connecting wirelessly to a base station present in the specific region in the specific time band, and the control unit may be set to perform a connection process for connecting to the base station based on the set connection rights. In this manner, an action of performing the connection process for connecting to the base station present in the specific region in the specific time band is carried out based on the set connection rights.

Moreover, in the first embodiment, the control unit may be set to perform a connection process for connecting to the predetermined network based on the set connection rights only when the wireless communication apparatus is present in the specific region in a specific time band. In this manner, an action of performing a connection process based on the set connection rights is carried out only when the wireless communication apparatus is present in a specific region in a specific time band.

Moreover, in the first embodiment, an operation receiving unit receiving a designation operation for designating the specific time band and the specific region may be further provided, and the communication control unit may be set to transmit the reservation request including the received specific time band and specific region. In this manner, an action of transmitting the reservation request including the received specific time band and specific region is carried out.

Moreover, in the first embodiment, the communication control unit transmits the reservation request to an information processing apparatus performing reservation registering of the connection rights according to the reservation request, and the information processing apparatus may be set to extract a base station capable of connecting in a specific time band from among base stations present in the specific region and to transmit the setting information for setting the connection rights for connecting to the predetermined network to the wireless communication apparatus by wirelessly connecting to the extracted base station. In this manner, the information processing apparatus extracts a base station capable of connecting in a specific time band from among the base stations present in a specific region, and transmits the setting information for setting the connection rights for connecting to a predetermined network to the wireless communication apparatus by wirelessly connecting to the extracted base station.

Moreover, in the first embodiment, the information processing apparatus may be set to extract only a base station for which the number of wireless communication apparatuses, in which the connection rights for connecting to the extracted base station are set, is small with reference to a threshold. Here, a case where the number with reference to the threshold is small includes the meanings of a case where the number is the threshold or less, and a case where the number is less than the threshold. In this manner, an action of extracting only a base station for which the number of wireless communication apparatuses, in which the connection rights for connecting to an extracted base station are set, is small with reference to a threshold is carried out.

Moreover, in the first embodiment, in a case where a base station capable of connecting in the specific time band from among base stations present in the specific region may not be extracted, the information processing apparatus may be set to transmit the setting information capable of setting the connection rights according to the reservation request to the wireless communication apparatus only in a case where the cancellation of the connection rights set for other wireless communication apparatuses is generated. In this manner, in a case where a base station capable of connecting in a specific time band from among base stations present in a specific region is not extracted, an action of transmitting the setting information capable of setting the connection rights according to the reservation request to the wireless communication apparatus only in a case where the cancellation of the connection rights set for other wireless communication apparatuses is generated is carried out.

Moreover, in the first embodiment, the information processing apparatus may be set to specify a position in which the wireless communication apparatus is present in the specific time band based on the movement route prediction of the wireless communication apparatus, to determine a region including the specified position as the specific region, and to transmit the setting information for setting the connection rights for wirelessly connecting to the predetermined network in the determined specific region to the wireless communication apparatus. In this manner, an action of determining a specific region by specifying a position in which a wireless communication apparatus is present in a specific time band based on the movement route prediction of the wireless communication apparatus, and transmitting the setting information for setting the connection rights for wirelessly connecting to the predetermined network in the determined specific region to the wireless communication apparatus is carried out.

Moreover, in the first embodiment, the communication control unit transmits a transfer request for transferring the set connection rights to other wireless communication apparatuses to an information processing apparatus performing reservation registration of connection rights according to the reservation request, and the information processing apparatus may be set to transfer the set connection rights to the other wireless communication apparatus based on the transfer request and change the reservation registration of the connection rights. In this manner, an action of transmitting a transfer request for transferring set connection rights to other wireless communication apparatuses to an information processing apparatus so that the information processing apparatus transfers the set connection rights to the other wireless communication apparatus based on the transfer request and changes the reservation registration of the connection rights is carried out.

In addition, the second embodiment of the present disclosure is a communication system and information processing method including: a wireless communication apparatus provided with a communication control unit transmitting a reservation request of connection rights for wirelessly connecting to a predetermined network in a specific region in a specific time band to an information processing apparatus performing reservation registration of the connection rights according to the reservation request, and a control unit performing control setting the connection rights based on setting information according to the reservation request from the information processing apparatus; and an information processing apparatus extracting a base station capable of connecting in a specific time band from among base stations present in the specific region and transmitting the setting information for setting the connection rights for connecting to the predetermined network to the wireless communication apparatus by wirelessly connecting to the extracted base station, as well as a program causing a computer to execute the above method. In this manner, the wireless communication apparatus transmits a reservation request of connection rights to the information processing apparatus and sets the connection rights based on the setting information according to the reservation request from the information processing apparatus, and the information processing apparatus may be set to extract a base station capable of connecting to a specific time band from among base stations present in a specific region and transmit the setting information for setting the connection rights for connecting to the predetermined network to the wireless communication apparatus by wirelessly connecting to the extracted base station.

According to the embodiments of the present disclosure, it is possible to achieve an excellent effect of providing an appropriate wireless connection service at a location and timing desired by a user.

BRIEF DESCRIPTION OF THE DRAWINGS

FIG. 2 is a block diagram showing a system configuration example of a communication system in the first embodiment of the present disclosure.

FIG. 4 is a diagram schematically showing an example of stored content in a reservation information storage unit in the first embodiment of the present disclosure.

FIG. 5 is a diagram schematically showing an example of stored content of a terminal management information storage unit in the first embodiment of the present disclosure.

FIG. 9 is a diagram showing a display screen example displayed on the wireless communication apparatus in the first embodiment of the present disclosure.

FIG. 10 is a diagram showing a display screen example displayed on the wireless communication apparatus in the first embodiment of the present disclosure.

FIG. 11 is a diagram showing a display screen example displayed on the wireless communication apparatus in the first embodiment of the present disclosure.

FIG. 13 is a diagram showing a display screen example displayed on the wireless communication apparatus in the first embodiment of the present disclosure.

DETAILED DESCRIPTION OF EMBODIMENTS

Below, description will be given of embodiments for realizing the present disclosure (hereafter, referred to as embodiments). Description will be given in the following order.

1. First Embodiment (Reservation control: example of reserving connection rights for connecting to a base station at a desired time and place according to a user's operation)

2. Second Embodiment (Reservation control: example of reserving connection rights automatically)

3. Third Embodiment (Connection rights transfer control: example of transferring reserved connection rights)

1. First Embodiment

[Use Example of Wireless Communication Apparatus]

Figure 1A:
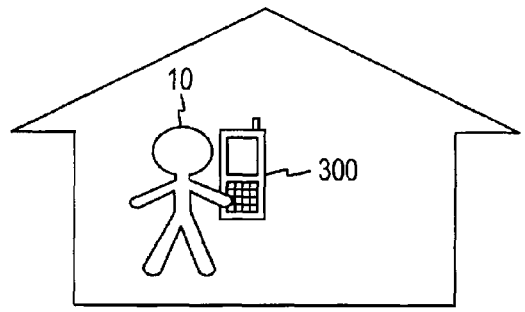
FIGS. 1A and 1B are diagrams showing a simplified use example of a wireless communication apparatus in the first embodiment of the present disclosure.
Figure 1B:
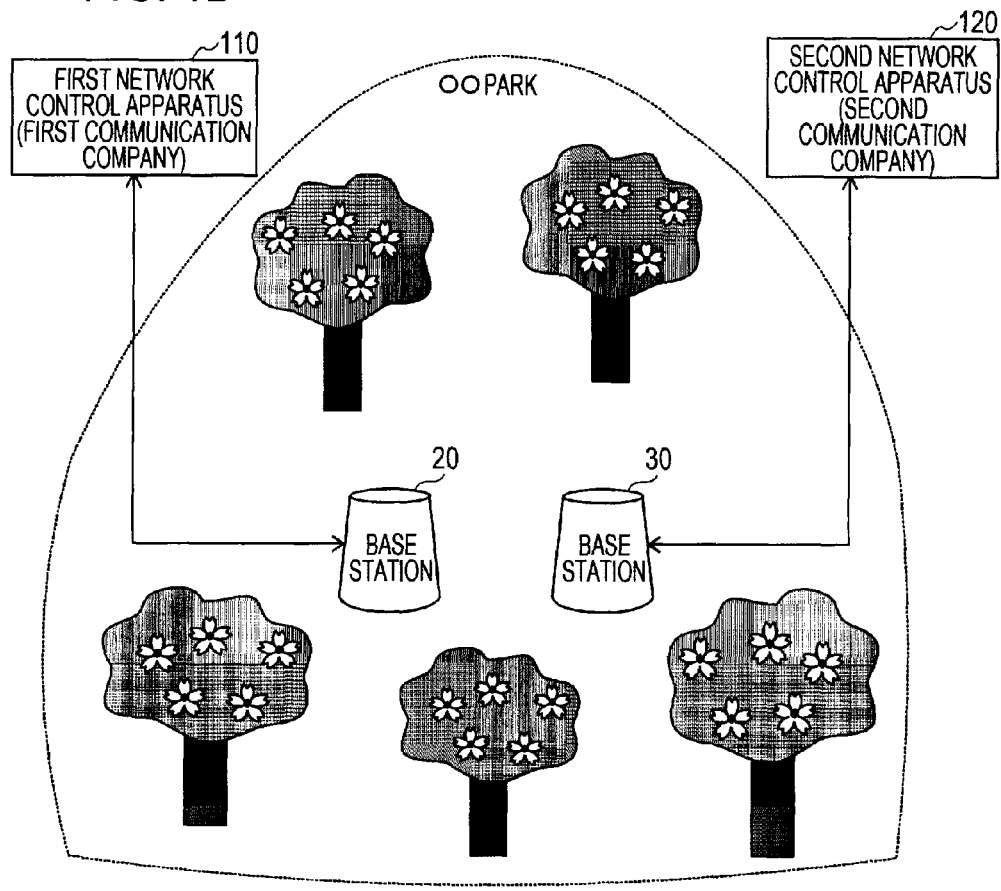

FIGS. 1A and 1B are diagrams showing a simplified use example of a wireless communication apparatus 300 in the first embodiment of the present disclosure. The wireless communication apparatus 300 is, for example, a mobile telephone device (for example, a smart phone), an E-book reader provided with a wireless communication function, or an information processing apparatus provided with a wireless communication function (for example, a notebook type personal computer).

FIG. 1A shows a state in which a user 10 uses the wireless communication apparatus 300 before the 1st April (Fri). FIG. 1B shows a simplification of XX park which the user 10 is planning to visit during the cherry blossom viewing period (for example, 2nd April (Sat)). Here, when communication is performed using the wireless communication apparatus 300 in XX park, it is important to wirelessly connect to the base station 20 or 30. In addition, the base station 20 is managed by the first communication company (first network control apparatus 110) and the base station 30 is managed by the second communication company (second network control apparatus 120). Moreover, the first communication company and the second communication company are moving communication companies providing a wireless connection service.

Here the user 10 who owns the wireless communication apparatus 300 makes a contract for the wireless connection service with the first communication company. That is, the user 10 makes a contract enabling use of the base station 20 maintained by the first communication company. For example, the wireless communication apparatus 300 may use the mobile phone network of the first communication company by holding USIM (Universal Subscriber Identity Module) information of the first communication company. For this reason, for example, in XX park shown in FIG. 1B, the wireless communication apparatus 300 may use the base station 20 based on the USIM information relating to the first communication company. Here, the USIM information is an example of contract certification information, and the contract certification information includes phone subscriber information and authentication information.

Here, since the time at which the user 10 visits XX park is during the cherry blossom viewing period, it may be assumed that the park will be crowded. For example, a case may be assumed in which the crowding level of the base station 20 to which the wireless communication apparatus 300 may connect is great and the crowding level of the base station 30 to which the wireless communication apparatus 300 may not connect is low. In such a case, when the user 10 visits XX park, it is possible to connect to the base station 30 of which the crowding level is low by making a new connection rights setting contract with the second communication company managing the base station 30.

However, when the user 10 attempts to make a setting contract at the time of visiting XX park, since it is the cherry blossom viewing period, it may be assumed that the park will be crowded. Further, even when it is possible to make the setting contract, the number of people making the setting contract is great and it may also be assumed that the crowding level of the base station 30 will become great. In such a case, regardless of whether the setting contract is performed, it may be assumed that predetermined communication may not be performed.

Thus, in the first embodiment of the present disclosure, an example is shown of performing connection rights reservation so that it is possible for the user 10 to appropriately use the wireless communication apparatus 300 in the time band (specific time band) and the place (specific place) desired by the user 10. Here, the connection rights are for wirelessly connecting to a base station, for example, rights for connecting to a base station based on USIM information. Further, in the first embodiment of the present disclosure, the connection rights are set to include the meaning of rights for connecting only to a specific base station through a wireless network in a specific time band.

[Configuration Example of a Communication System]

FIG. 2 is a block diagram showing a system configuration example of a communication system 100 in the first embodiment of the present disclosure.

The communication system 100 is provided with a public network 101, a first network control apparatus 110, a second network control apparatus 120, base stations 111, 112, 121, and 122, an information processing apparatus 200, and a wireless communication apparatus 300.

The public network 101 is a public network such as a phone network or the Internet. Further, the public network 101 connects the first network control apparatus 110 and the second network control apparatus 120 through a gateway (not shown).

Base stations 111 and 112 are managed by the first communication company and are moving communication base stations (Node B) connecting the wireless communication apparatus holding USIM information relating to the first communication company and the first network control apparatus 110 through a wireless network. As described above, the user 10 who owns the wireless communication apparatus 300 makes a contract with the first communication company to use the base stations 111 and 112.

Further, FIG. 2 schematically shows that the range reached by the radio waves of the base station 111 (range in which wireless communication is possible) is set as cell 113 and the range reached by the radio waves of the base station 112 is set as cell 114.

In addition, in the embodiments of the present disclosure, the base stations are set to include the meaning of the base stations themselves and also the cell specified by the base stations. For example, in the embodiments of the present disclosure, the contract to use the base station is set to include the meaning of a contract to use the cell specified by that base station.

Base stations 121 and 122 are managed by the second communication company and are moving communication base stations (Node B) connecting the wireless communication apparatus holding USIM information relating to the second communication company and the second network control apparatus 120 through a wireless network. As described above, the user 10 has not made a contract with the second communication company to use the base stations 121 and 122. Here, the base station 121, for example, is set as one for which the number of users is comparatively limited (such as a femtocell base station).

In addition, FIG. 2 schematically shows that the range reached by the radio waves of the base station 121 is set as cell 123 and the range reached by the radio waves of the base station 122 is set as cell 124. Further, cell 123 corresponding to base station 121 and cell 114 corresponding to base station 112 are set so that the ranges thereof overlap.

Further, in FIG. 2, for convenience of description, only the first communication company and the second communication company are shown as the communication companies; however, it is possible to apply the present disclosure in the same manner to a case in which there are three or more communication companies. Furthermore, in FIG. 2, for convenience of description, only base stations 111, 112, 121, and 122 are shown as the base stations managed by the respective communication companies; however, it is possible to apply the present disclosure in the same manner to a case in which there are three or more base stations managed by each communication company.

The first network control apparatus 110 is a communication control apparatus managed by the first communication company providing the wireless connection service and performs certification control of the wireless communication apparatus connected through the base stations 111 and 112. Here, the first network control apparatus 110 connects the certified wireless communication apparatus to a public network 101 though a gateway (not shown).

The second network control apparatus 120 is a communication control apparatus managed by the second communication company providing the wireless connection service and performs certification control of the wireless communication apparatus connected through the base stations 121 and 122. Here, the second network control apparatus 120 connects the certified wireless communication apparatus to a public network 101 though a gateway (not shown).

Here, the first network control apparatus 110 certifies only the wireless communication apparatuses holding valid USIM information (contract certification information) among the wireless communication apparatuses connected through the base stations 111 and 112, save for specific cases. Further, in the same manner, the second network control apparatus 120 certifies only the wireless communication apparatuses holding valid USIM information (contract certification information) among the wireless communication apparatuses connected through the base stations 121 and 122, save for specific cases. Further, the specific cases are, for example, cases of calling during an emergency (for example, cases of calling the police or the fire service).

In addition, the first network control apparatus 110 and the second network control apparatus 120 output each kind of information transmitted from the wireless communication apparatus through each base station to the information processing apparatus 200. Further, the first network control apparatus 110 and the second network control apparatus 120 transmit each kind of information output from the information processing apparatus 200 to each wireless communication apparatus through each base station.

The information processing apparatus 200 is an information processing apparatus (for example, a reservation server) managed by the company providing the communication service, and performs the reservation process and setting process of the connection rights based on the information from the first network control apparatus 110 and the second network control apparatus 120. Here, the company providing the communication service is assumed to be a communication company providing a wireless connection service, a MVNO (Mobile Virtual Network Operator) or the like (in other words, a company having a corporate structure used as a virtual communication company). Further, the details of the information processing apparatus 200 will be described later with reference to FIG. 3.

[Configuration Example of Information Processing Apparatus]

Figure 3:
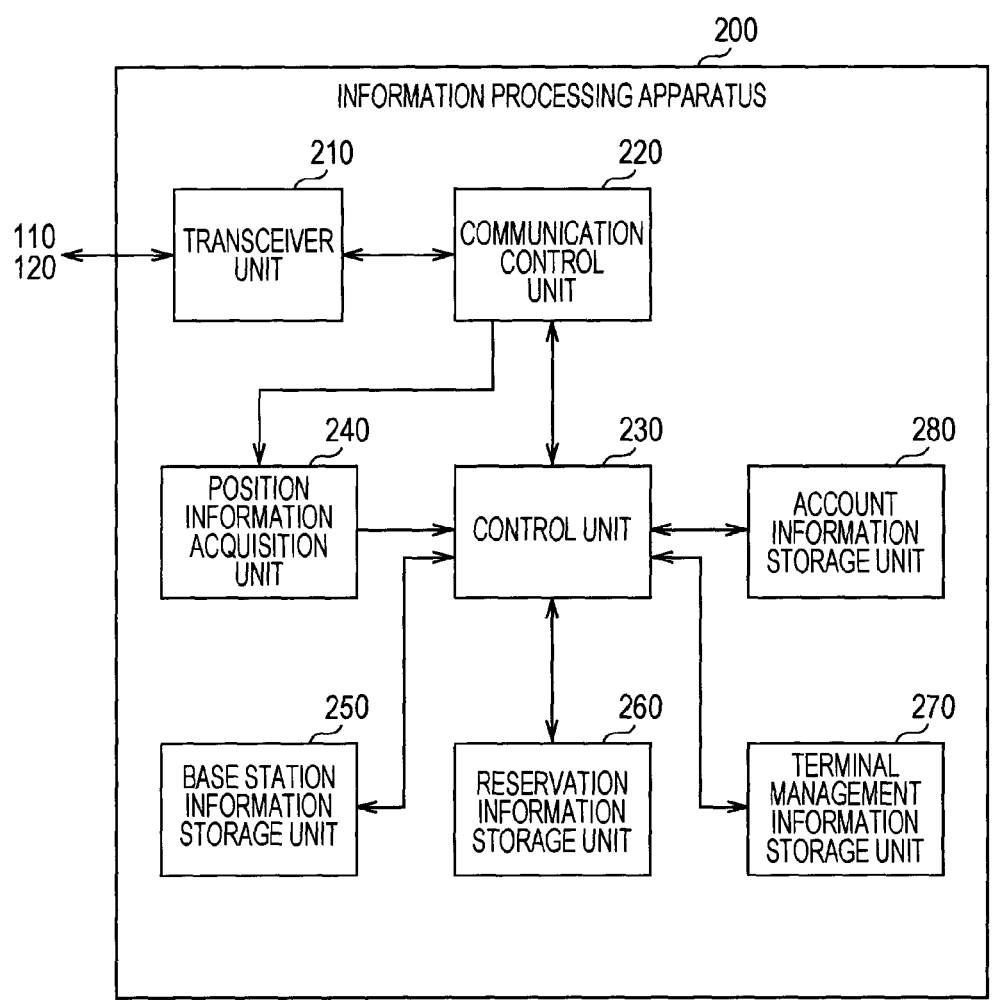
FIG. 3 is a block diagram showing a function configuration example of an information processing apparatus in the first embodiment of the present disclosure.

FIG. 3 is a block diagram showing a function configuration example of the information processing apparatus 200 in the first embodiment of the present disclosure.

The information processing apparatus 200 is provided with the transceiver unit 210, the communication control unit 220, the control unit 230, the position information acquisition unit 240, the base station information storage unit 250, the reservation information storage unit 260, the terminal management information storage unit 270 and the billing information storage unit 280.

The transceiver unit 210 performs transmission and reception of each kind of information between the first network control apparatus 110, the second network control apparatus 120 and the wireless communication apparatus 300 based on the communication control unit 220. For example, the transceiver unit 210 respectively receives information transmitted from the wireless communication apparatus 300 (for example, a reservation information request, or a reservation request) through the first network control apparatus 110 and the second network control apparatus 120. Here, the transceiver unit 210 respectively outputs information to the communication control unit 220. Further, the transceiver unit 210 transmits the information output from the communication control unit 220 to the wireless communication apparatus 300 through the first network control apparatus 110 and the second network control apparatus 120.

The communication control unit 220 is connected to the first network control apparatus 110 and the second network control apparatus 120 through the transceiver unit 210 and performs each type of communication control based on the control of the control unit 230. That is, the communication control unit 220 performs communication control carried out between the first network control apparatus 110, the second network control apparatus 120, and the wireless communication apparatus 300.

The control unit 230 performs each type of control based on a control program stored in the memory (not shown). The control unit 230 is configured of a microprocessor, for example. For example, the control unit 230 is connected to the communication control unit 220, and performs transmission and reception control of each kind of data carried out between the first network control apparatus 110 and the second network control apparatus 120.

For example, the control unit 230 respectively acquires information included in the reservation request transmitted from the wireless communication apparatus 300 (specific region (reservation place), specific time band (reservation time)). Here, the control unit 230 extracts a base station which is capable of connecting at a specific time band from the base stations present in the specific region. Subsequently, the control unit 230 transmits the setting information for setting the connection rights for wirelessly connecting to the extracted base station to the wireless communication apparatus 300 and performs reservation registration of the connection rights. That is, when the reservation registration of the connection rights is performed, the control unit 230 performs control setting the connection rights (for example, connection rights based on USIM information) in the wireless communication apparatus 300 for which the reservation registration is performed. Further, in the reservation registration, information relating to the reservation is respectively recorded in the reservation information storage unit 260 and the terminal management information storage unit 270.

Here, the setting information is for setting the connection rights, and includes, for example, encrypted information used in a communication path encryption protocol, the IP (Internet Protocol) address of each kind of server, and information relating to the reservation registration. Here, each kind of server is a DNS (Domain Name System) server, a DHCP (Dynamic Host Configuration Protocol) server, or the like. Further, there is a CSCF (Call Session Control Function) server or the like. Further, the information relating to the reservation registration includes, for example, position information relating to the reservation place (for example, the latitude, the longitude, and the range of the reservation place), time information relating to the reservation time (for example, start time, finish time), and information relating to communication (information relating to the frequency band, communication format, and the connection partner base station). Further, when the connection rights which are the target of the setting are rights for connecting to a base station based on USIM information, the setting method (for example, setting according to a validating/invalidating process, or setting according to rewriting of USIM information) for setting the valid USIM information is included in the setting information.

In addition, in a case where the communication service through the base station relating to the reservation registration after the connection rights are set is finished, the control unit 230 performs control so as to set the original connection rights in the wireless communication apparatus 300 (restoration process). In other words, the control unit 230 performs a USIM information rewriting process and a restoration process for the wireless communication apparatus 300 that is the target. Further, after the restoration process is performed, the control unit 230 deletes the information relating to the wireless communication apparatus 300 from the terminal management information storage unit 270.

Furthermore, it is assumed that there will be cases in which a base station capable of connecting at a specific time band is not extracted from among the base stations present in a specific region. In such a case, the control unit 230 transmits setting information capable of setting the connection rights according to the reservation request to the wireless communication apparatus only in the case in which cancellation of the connection rights set in other wireless communication apparatuses is carried out.

The position information acquisition unit 240 acquires position information showing the position at which the wireless communication apparatus 300 is present based on information output from the communication control unit 220, and outputs the acquired position information to the control unit 230. For example, the position information acquisition unit 240 may acquire the position information acquired using the position information acquisition unit 320 provided in the wireless communication apparatus 300 (shown in FIG. 4) through the first network control apparatus 110 and the second network control apparatus 120. Further, the position information acquisition unit 240 acquires position information from the first network control apparatus 110 and the second network control apparatus 120 periodically or irregularly.

The base station information storage unit 250 is a storage unit storing information relating to the base stations (base station information), and supplies the stored base station information to the control unit 230. In the base station information storage unit 250, identification information for identifying each base station (base station ID), information relating to the position at which each base station is installed (position information), and information relating to the communication format capable of communication with each base station (communication format information) are associated with each base station and stored. Here, the communication format capable of communication with each base station may be one or a plurality of communication formats capable of communication with the wireless communication apparatus 300. For example, the communication format may be LT (Long Term Evolution), LTE-A (LTE-advanced), or IEEE802.11a/b/n/g. Further, for example, it may be W-CDMA (Wideband Code Division Multiple Access), or HSPA+ (High Speed Packet Access Plus). Further, for example, it may be GPRS (General Packet Radio Service), or WiMAX (Worldwide Interoperability for Microwave Access).

The reservation information storage unit 260 is a storage unit storing information relating to reservation of the connection rights for connecting each wireless communication apparatus to the base station (reservation information), and supplies the stored reservation information to the control unit 230. Further, detailed description will be given of the stored contents of the reservation information storage unit 260 with reference to FIG. 4.

The terminal management information storage unit 270 is a storage unit storing information for managing the wireless communication apparatuses for which connection rights are set based on the reservation request (terminal management information), and supplies the stored terminal management information to the control unit 230. Further, detailed description will be given of the stored contents of the terminal management information storage unit 270 with reference to FIG. 5.

The billing information storage unit 280 is a storage unit for storing information relating to the billing concerning the communication in the case where communication is performed based on the connection rights using a wireless communication apparatus in which the connection rights are set based on the reservation request (billing information). Further, the billing information storage unit 280 supplies the stored billing information to the control unit 230.

[Content Example of Reservation Information Storage Unit]

FIG. 4 is a diagram schematically showing an example of stored content in the reservation information storage unit 260 in the first embodiment of the present disclosure.

The reservation information storage unit 260 is a storage unit storing information relating to the reservation of connection rights set based on reservation requests from each wireless communication apparatus (reservation information). Specifically, in the reservation information storage unit 260, the time information 261 and the reservation terminal ID 262 are associated with each base station and stored.

The time information 261 shows the time band of a predetermined time interval. Here, in FIG. 6, for convenience of description, time bands at intervals of 30 minutes are shown as the predetermined intervals.

The reservation terminal ID 262 is identification information for identifying the wireless communication apparatuses for which the connection rights are set based on the reservation request. Here, in FIG. 6, for convenience of description, description will be given of an example of a case in which the number of the wireless communication apparatuses capable of reserving the same time band is set to five. Further, one wireless communication apparatus is set to be capable of making a reservation across a plurality of time bands.

In addition, regarding the reservation process using the information processing apparatus 200 (the reservation process using the reservation information stored in the reservation information storage unit 260), detailed description will be given with reference to FIGS. 8 to 14, FIG. 17, and the like.

[Example of Terminal Control Information Storage Unit]

FIG. 5 is a diagram schematically showing an example of stored content of the terminal management information storage unit 270 in the first embodiment of the present disclosure.

The terminal management information storage unit 270 is a storage unit storing information for managing the wireless communication apparatuses for which a reservation is established based on a reservation request from each wireless communication apparatus or wireless communication apparatuses which are registered on a cancellation waiting list based on the reservation request (terminal management information). Specifically, in the terminal management information storage unit 270, the user ID 271, the base station ID 272, the company ID 273, the cancellation waiting list reservation time 274, the start time 275, the finish time 276, the terminal ID 277, and the communication format 278 are associated with each user and stored.

The user ID 271 is identification information for identifying the user who owns a wireless communication apparatus.

The base station ID 272 is identification information for identifying the base station that is the reservation target.

The company ID 273 is identification information for identifying the communication company that manages the base station that is the reservation target.

The cancellation waiting list reservation time 274 is information showing the time at which a cancellation waiting list reservation is made by a user who performed a reservation request.

The start time 275 is information showing the start time of the time band relating to the reservation registration in a case where reservation registration is performed.

The finish time 276 is information showing the finish time of the time band relating to the reservation registration in a case where reservation registration is performed.

The terminal ID 277 is identification information for identifying the wireless communication apparatus belonging to a user.

The communication format 278 is information showing the communication format in the wireless communication apparatus belonging to a user.

[Configuration Example of a Wireless Communication Apparatus]

Figure 6:
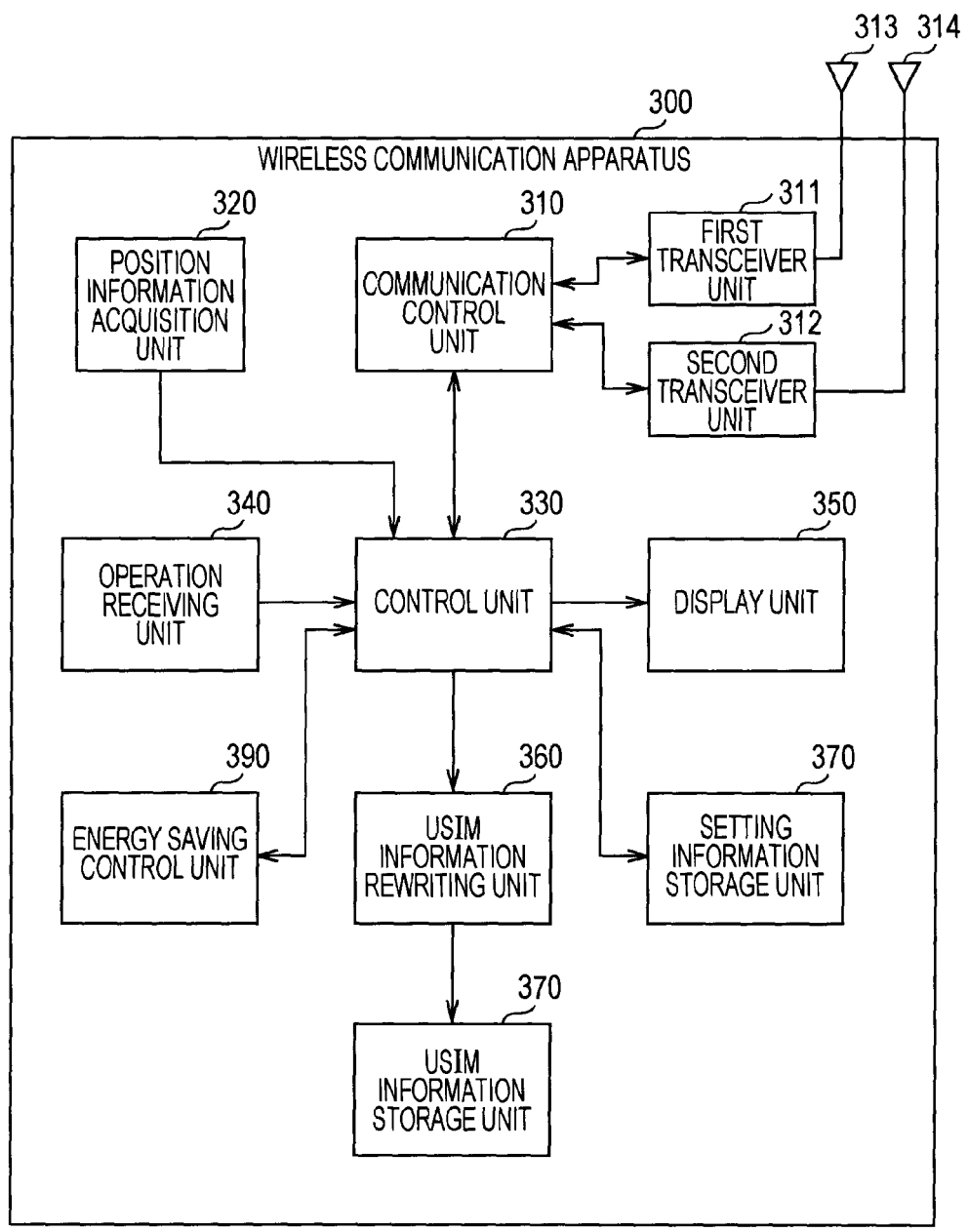
FIG. 6 is a block diagram showing a function configuration example of a wireless communication apparatus in the first embodiment of the present disclosure.

FIG. 6 is a block diagram showing a function configuration example of the wireless communication apparatus 300 in the first embodiment of the present disclosure.

The wireless communication apparatus 300 is provided with a communication control unit 310, a first transceiver unit 311, a second transceiver unit 312, antennas 313 and 314, and a position information acquisition unit 320. Further, the wireless communication apparatus 300 is provided with a control unit 330, an operation receiving unit 340, a display unit 350, a USIM information rewriting unit 360, a USIM information storage unit 370, a setting information storage unit 380, and an energy saving control unit 390. The wireless communication apparatus 300 may be realized, for example, by a mobile phone capable of making telephone calls and performing data communication. Here, the microphone, speakers, and the like are left out of the drawings, and description thereof is omitted.

The first transceiver unit 311 and the second transceiver unit 312 transmit and receive various types of information based on the control of the communication control unit 310. That is, the first transceiver unit 311 includes a reception unit receiving a wireless signal transmitted from each base station through the antenna 313, and a transmission unit transmitting a wireless signal to each base station through the antenna 313, and is a communication unit corresponding to a predetermined wireless communication service. In addition, the second transceiver unit 312 includes a reception unit receiving a wireless signal transmitted from each base station through the antenna 314, and a transmission unit transmitting a wireless signal to each base station through the antenna 314, and is a communication unit corresponding to a predetermined wireless communication service. Here, the wireless communication services corresponding to the first transceiver unit 311 and the second transceiver unit 312 are set to be mutually different. For example, the first transceiver unit 311 and the second transceiver unit 312 may perform communication according to the above-described communication formats (LTE, LTE-A, IEEE802.11a/b/n/g, W-CDMA, HSPA+, GPRS, and WiMAX).

The communication control unit 310 performs various types of communication control based on the control of the control unit 330. For example, the communication control unit 310 performs communication control carried out between the first network control apparatus 110, the second network control apparatus 120, and the information processing apparatus 200.

The position information acquisition unit 320 acquires position information showing the position at which the wireless communication apparatus 300 is present, and outputs the acquired position information to the control unit 330. The position information acquisition unit 320 may be realized by a GPS (Global Positioning System) unit calculating position information based on a GPS signal received by a GPS signal reception antenna. The calculated position information includes various data relating to the position such as the latitude, longitude, and height at the time of reception of the GPS signal. Further, it is possible to use a position information acquisition apparatus acquiring position information by another position information acquiring method. For example, a position information acquisition apparatus acquiring position information by deriving position information using access point information according to a wireless LAN (Local Area Network) in the vicinity may be used. Further, the position information acquisition unit 320 may be set to acquire time information as well as position information and to include the time information in the position information. In such a case, the time information may be used for synchronizing the times. For example, as the time information, data of a time synchronization satellite such as a GPS may be acquired and used.

The control unit 330 performs each type of control based on a control program stored in the memory (not shown). The control unit 330 is configured of a microprocessor, for example. For example, the control unit 330 is connected to the communication control unit 310, and performs transmission and reception control of each kind of data carried out between the first network control apparatus 110 and the second network control apparatus 120 connected through the base station.

For example, the communication control unit 310 transmits a connection rights reservation request for wirelessly connecting to a predetermined network in a specific region at a specific time band based on control of a control unit 330 to an information processing apparatus 200 performing connection rights reservation registration according to the reservation request. Further, the control unit 330 performs control setting connection rights based on setting information according to the reservation request. Thus, the control unit 330 performs a connection process for connecting to a base station installed in a specific region based on the set connection rights. In this case, during a specific time band, the control unit 330 performs the connection process only when the wireless communication apparatus 300 is present in a specific region.

The operation receiving unit 340 receives operation input as operated by the user, and outputs a signal according to the received operation input to the control unit 330. The operation receiving unit 340 is provided with various keys such as numeric keys and alphabetic keys.

The display unit 350 displays various kinds of information based on the control of the control unit 330 (such as character information, time information, and the like). The display unit 350 respectively displays the information relating to the reservation operation (for example, the display screens shown in FIGS. 8 to 11). As the display unit 350, for example, a display panel such as an organic EL (Electro Luminescence) panel, or an LCD (Liquid Crystal Display) panel may be used. Further, regarding the operation receiving unit 340 and the display unit 350, a configuration may be adopted of being integrated with the use of a touch panel by which it is possible to perform operation input by the user touching or approaching the display screen with a finger.

The USIM information rewriting unit 360 performs a rewriting process on the USIM information (contract certification information) held in the USIM information storage unit 370 based on the control of the control unit 330. Here, the state in which the USIM information relating to the first communication company is held may be understood as a state where the connection rights for connecting to the base stations 111 and 112 relating to the first communication company are set. Further, in a case where the connection rights are transferred, it is possible to transfer the connection rights by a validation process and an invalidation process of the USIM information. Further, it is possible to perform transfer of the connection rights by a process of passing on the USIM information itself.

The USIM information storage unit 370 is a storage unit storing USIM information (contract certification information). As the USIM information storage unit 370, for example, one using a UICC (Universal Integrated Circuit) card may be used, or one using a dedicated memory for securely preserving USIM information may be used. Further, in the case of using a UICC card as the USIM information storage unit 370, one capable of performing a validation process and an invalidation process with respect to the USIM information is used rather than one in which USIM information is fixedly written. That is, one in which the USIM information rewriting unit 360 may perform a validation process and an invalidation process with respect to the USIM information is used. Further, one for which a USIM information rewriting process is possible is used. Further, the validation process and the invalidation process with respect to the USIM information may be performed by the validation process and the invalidation process defined in the 3GPP (Third Generation Partnership Project). For example, each of these processes may be performed at a shop selling mobile phones. Further, when the USIM information is stored in the USIM information storage unit 370, it may be recorded while encrypted so that it may not be read by other communication companies.

The setting information storage unit 380 is a storage unit for storing setting information transmitted from the information processing apparatus 200. The connection rights relating to the reservation request are set based on such setting information.

The energy saving control unit 390 performs control for setting an energy saving mode in the wireless communication apparatus 300. For example, the energy saving mode is a mode regularly or intermittently generating a state in which predetermined operations (for example, transmission and reception operations) is not performed in order to reduce the electric power consumed. For example, it is possible to set the energy saving mode while waiting to receive a start command from the information processing apparatus 200.

[Configuration Example of Base Station]

Figure 7:
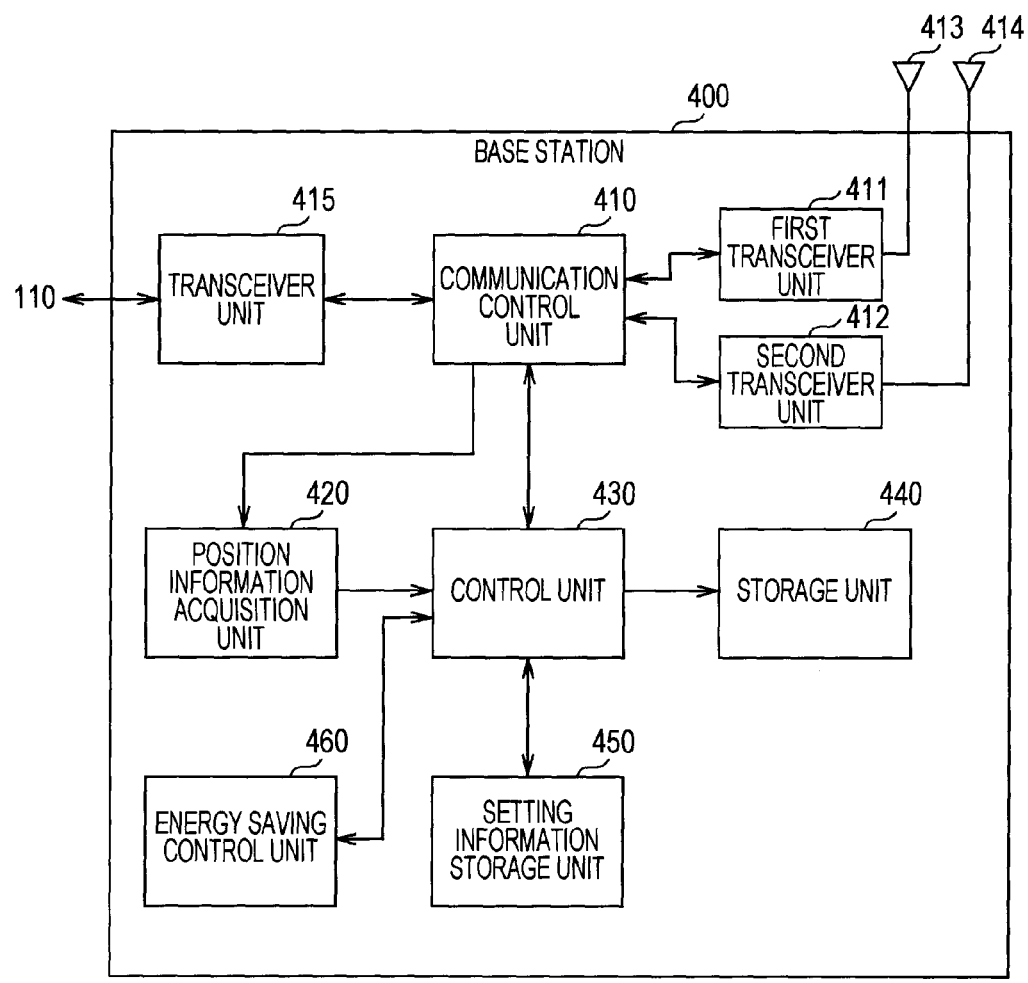
FIG. 7 is a block diagram showing a function configuration example of a base station in the first embodiment of the present disclosure.

FIG. 7 is a block diagram showing a function configuration example of a base station 400 in the first embodiment of the present disclosure.

The base station 400 is provided with a communication control unit 410, a first transceiver unit 411, a second transceiver unit 412, antennas 413 and 414, a transceiver unit 415, and a position information acquisition unit 420. In addition, the base station 400 is provided with a control unit 430, a storage unit 440, a setting information storage unit 450, and an energy saving control unit 460. Further, the base station 400 is managed by the first communication company and is connected to a first network control apparatus 110. Further, the other base station 400 managed by the first communication company and the base stations managed by the second communication company have the same configuration as the base station 400. Thus, description will be omitted for base stations other than the base station 400.

The first transceiver unit 411 and the second transceiver unit 412 transmit and receive various kinds of information based on the control of the communication control unit 410. In other words, the first transceiver unit 411 includes a reception unit receiving a wireless signal transmitted from each wireless communication apparatus through the antenna 413, and a transmission unit transmitting a wireless signal to each wireless communication apparatus through the antenna 413, and is a communication unit corresponding to a predetermined wireless communication service. In addition, the second transceiver unit 412 includes a reception unit receiving a wireless signal transmitted from each wireless communication apparatus through the antenna 414, and a transmission unit transmitting a wireless signal to each wireless communication apparatus through the antenna 414, and is a communication unit corresponding to a predetermined wireless communication service. Here, the wireless communication services corresponding to the first transceiver unit 411 and the second transceiver unit 412 are set to be mutually different. Further, the wireless communication services corresponding to the first transceiver unit 411 and the second transceiver unit 412 correspond to the wireless communication services in the wireless communication apparatus 300 (the first transceiver unit 311 and the second transceiver unit 312).

The transceiver unit 415 transmits and receives various kinds of information corresponding to the first network control apparatus 110 based on the control of the communication control unit 410. That is, the transceiver unit 415 is a communication unit including a reception unit receiving information transmitted from the first network control apparatus 110, and a transmission unit transmitting information transmitted to the first network control apparatus 110.

The communication control unit 410 performs various types of communication control based on the control of the control unit 430. For example, the communication control unit 410 performs communication control carried out with the information processing apparatus 200 through the first transceiver unit 411 and the second transceiver unit 412. Further, for example, the communication control unit 410 performs communication control carried out with the first network control apparatus 110 through the transceiver unit 415.

The position information acquisition unit 420 acquires position information showing the position at which the wireless communication apparatus 300 is present based on information output from the communication control unit 410, and outputs the acquired position information to the control unit 430. For example, the position information acquisition unit 420 may periodically or irregularly acquire the position information acquired using the position information acquisition unit 320 provided in the wireless communication apparatus 300.

The control unit 430 performs each type of control based on a control program stored in the memory (not shown). The control unit 430 is configured of a microprocessor, for example. For example, the control unit 430 is connected to the communication control unit 410, and performs transmission and reception control of each kind of data carried out between the first network control apparatus 110 and the wireless communication apparatus 300.

The storage unit 440 is a memory for storing various kinds of information and stores various kinds of information.

The setting information storage unit 450 is a storage unit for storing setting information transmitted from the information processing apparatus 200. The setting information is the same as the setting information stored in the setting information storage unit 380 of the wireless communication apparatus 300. For this reason, for example, based on the setting information stored in the setting information storage unit 450, the base station 400 may set the connection rights relating to the reservation registration in the wireless communication apparatus 300.

The energy saving control unit 460 performs control for setting the energy saving mode in the base station 400. For example, it is possible to set the energy saving mode while waiting to receive a start command from the information processing apparatus 200.

[Communication Example Between Each Apparatus During Reservation]

FIGS. 8 to 11 are diagrams showing display screen examples displayed on the wireless communication apparatus 300 in the first embodiment of the present disclosure.

Detailed description will be given regarding the display screens with reference to the sequence chart shown in FIG. 12.

Figure 12:
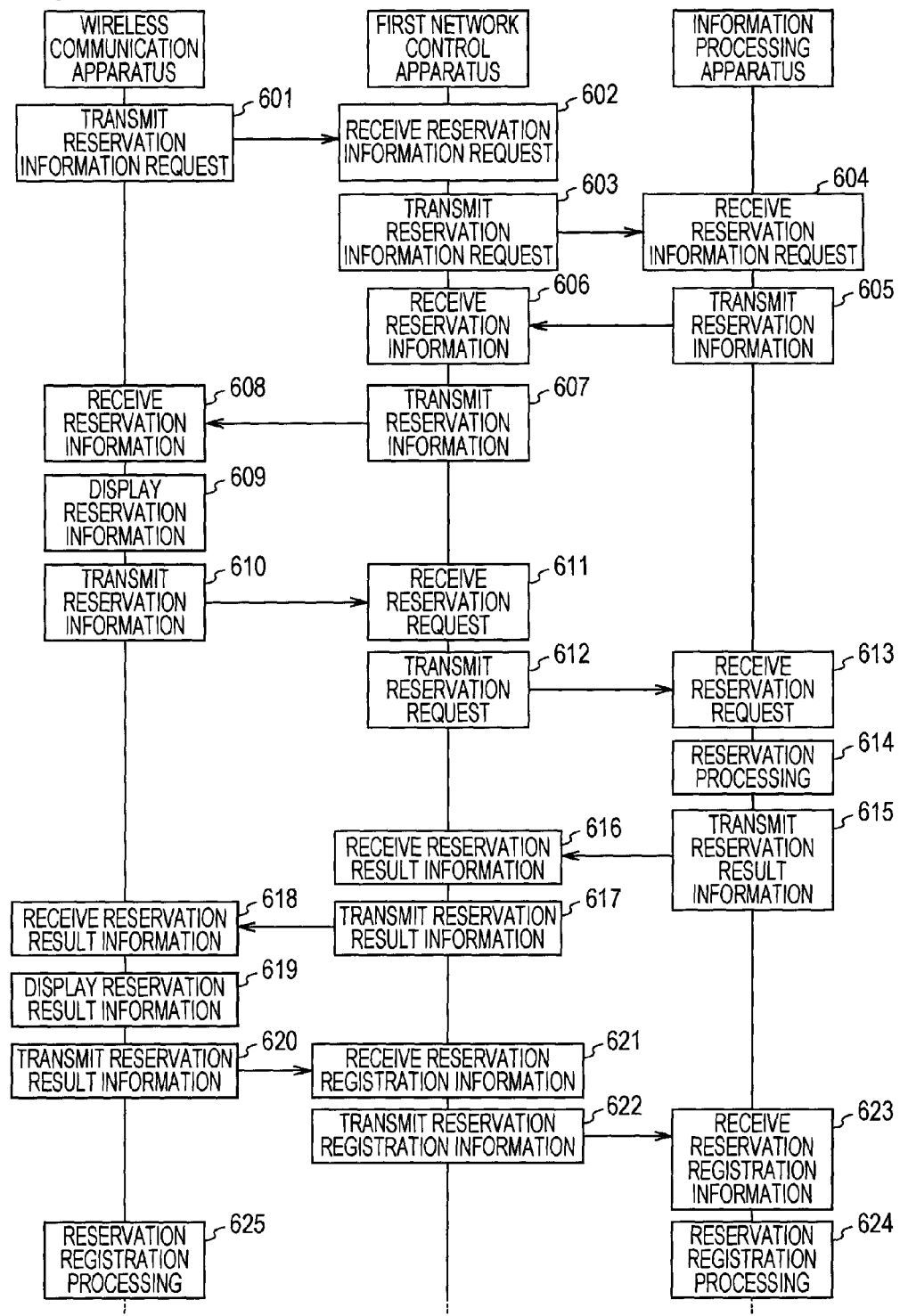
FIG. 12 is a sequence chart showing a communication processing example between each apparatus configuring the communication system in the first embodiment of the present disclosure.

FIG. 12 is a sequence chart showing a communication processing example between each apparatus configuring the communication system 100 in the first embodiment of the present disclosure. FIG. 12 shows an example of reserving connection rights for connecting a user of a wireless communication apparatus 300 to a base station (for example, the base station 121 shown in FIG. 2) managed by the second communication company in a case where the wireless communication apparatus 300 holds USIM information relating to the first communication company. In addition, FIG. 12 omits to show the base station connected to the wireless communication apparatus 300 and the first network control apparatus 110.

First, in the wireless communication apparatus 300 which holds the USIM information relating to the first communication company, a user operation is performed to carry out a reservation information request for acquiring reservation information used when performing a reservation request. When the user operation is performed, the reservation information request is transmitted from the wireless communication apparatus 300 to the information processing apparatus 200 through the first network control apparatus 110 (601 to 604). Here, for example, the reservation request signifies a request for reserving connection rights for receiving the provision of a wireless connection service in a time band and place desired by the user. Further, for example, the reservation information is for displaying the reservation operation screen 500 shown in FIG. 8.

Upon receiving a reservation information request from the wireless communication apparatus 300 (604), the information processing apparatus 200 transmits reservation information corresponding to the reservation information request to the wireless communication apparatus 300 which transmitted the reservation information request through the first network control apparatus 110 (605 to 608). When the reservation information from the information processing apparatus 200 is received (608), the control unit 330 of the wireless communication apparatus 300 displays a reservation operation screen for performing a reservation request on the display unit 350 based on the reservation information (609). This display example is shown in FIG. 8.

Figure 8:
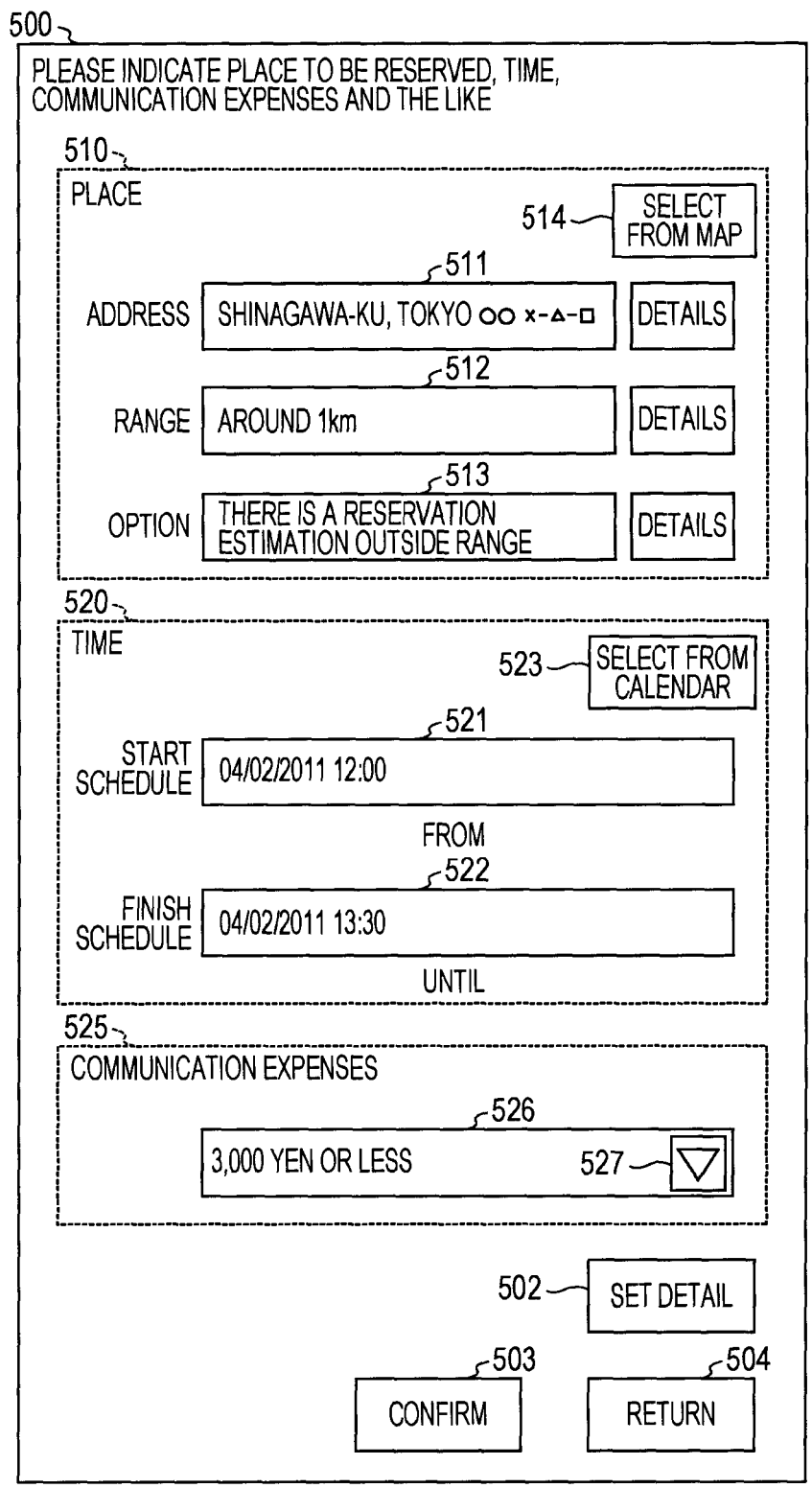
FIG. 8 is a diagram showing a display screen example displayed on the wireless communication apparatus in the first embodiment of the present disclosure.

FIG. 8 shows an example of a display screen (reservation operation screen 500) displayed on the display unit 350 when reservation information is received from the information processing apparatus 200. The reservation operation screen 500 is a display screen for performing designation of the reservation conditions desired by the user (place, time band, communication expenses, and the like), and performing reservation of connection rights corresponding to the designated reservation conditions. Specifically, the reservation operation screen 500 displays a details setting button 502, a confirm button 503, a return button 504, a place designation region 510, a time designation region 520, and a communication expenses designation region 525.

The details setting button 502 is a button to be pressed when displaying the details setting screen for performing setting of the details according to a user operation, with respect to the reservation conditions desired by the user (place, time band, communication expenses, and the like). By performing the details setting of the reservation conditions using the details setting screen displayed after pressing the details setting button 502, it is possible to set the details of the reservation conditions desired by the user. Here, the details setting screen is left out of the drawings and description thereof is omitted.

The confirm button 503 is a button to be pressed when confirming the operation content after operation input (input operation, selection operation, and the like) is performed in the reservation operation screen 500.

The return button 504, for example, is a button to be pressed when returning to the previously displayed display screen.

The place designation region 510 is a region for designating a place to perform communication using the wireless communication apparatus 300. For example, the place designation region 510 is provided with an address input field 511, a range designation field 512, an option designation field 513, and a map selection button 514.

The address input field 511 is a region for inputting the address of the place where communication is to be performed using the wireless communication apparatus 300.

The range designation field 512 is a region for inputting (for example, inputting the radius of a circle) a range (for example, a circular range) centering on the address input in the address input field 511 as the place where communication is to be performed using the wireless communication apparatus 300.

The option designation region 513 is a region for designating other conditions relating to the place where communication is to be performed using the wireless communication apparatus 300. For example, in the reservation time band, even in a case where a wireless communication apparatus 300 which is mid-communication comes out of the range of the reservation place, when it is desired to continue the communication, it is possible to designate an "out of range estimation reservation".

In addition, by pressing the details buttons arranged to the right of the respective address input field 511, range designation field 512, and option designation field 513, it is possible to display a details setting screen relating to the corresponding region.

The map selection button 514 is a button to be pressed when displaying the map for designating the place where communication is to be performed using the wireless communication apparatus 300. For example, it is possible to designate (for example, a certain range) the place where communication is to be performed using the wireless communication apparatus 300 using the map displayed after pressing the map selection button 514.

The time designation region 520 is a region for designating the time band in which communication is to be performed using the wireless communication apparatus 300. For example, the time designation region 520 is provided with a start time input field 521, a finish time input field 522, and a calendar selection button 523.

The start time input field 521 is a region for inputting a start time in the time band in which communication is to be performed using the wireless communication apparatus 300. The finish time input field 522 is a region for inputting a finish time in the time band in which communication is to be performed using the wireless communication apparatus 300.

The calendar selection button 523 is a button to be pressed in order to display the calendar for designating the time band in which communication is to be performed using the wireless communication apparatus 300. For example, using the calendar displayed after pressing the calendar selection button 523, it is possible to designate the time band in which communication is to be performed using the wireless communication apparatus 300.

The communication expenses designation region 525 is a region for designating the communication expenses desired by the user when performing communication using the wireless communication apparatus 300. For example, by pressing the pull down button 527, a list of the communication expenses is displayed and it is possible for the user to select the desired communication expenses from the list of communication expenses.

For example, in the reservation operation screen 500, when the confirm button 503 is pressed after the operation of designating the reservation conditions is performed by the user, the communication control unit 310 transmits the reservation request relating to the designated operation to the information processing apparatus 200 (610 to 613). That is, the reservation request relating to the designated operation is transmitted from the wireless communication apparatus 300 to the information processing apparatus 200 through the first network control apparatus 110 (610 to 613). Here, the reservation request includes each reservation condition designated in the reservation operation screen 500 (place, time band, communication expenses, and the like) and information relating to the wireless communication apparatus 300 (terminal ID, frequency band, usable communication formats and the like).

Upon receiving the reservation request from the wireless communication apparatus 300 (613), the control unit 230 performs a reservation process with respect to the reservation request (614).

Here, description will be given of the reservation process. First, the control unit 230 extracts a base station corresponding to the reservation place included in the received reservation request based on the base station information stored in the base station information storage unit 250. That is, base stations (one or a plurality of base stations) for which the reservation place included in the received reservation request is included inside the cells are extracted.

Subsequently, the control unit 230 specifies a communication format which may be used for communication between the extracted base station and the wireless communication apparatus 300 which transmitted the reservation request. That is, a communication format which matches the communication format which the extracted base station may use to communicate and the communication format which the wireless communication apparatus 300 which transmitted the reservation request may use to communicate is specified. Further, information relating to the communication format which the wireless communication apparatus 300 which transmitted the reservation request may use to communicate is included in the reservation request.

Subsequently, the control unit 230 extracts a base station provided with a communication format matching the reservation conditions relating to the reservation request (for example, communication speed, or communication expenses) from the base stations corresponding to the reservation place. That is, a base station provided with a communication format matching the reservation conditions relating to the reservation request is extracted from the base stations provided with the specified communication format.

Subsequently, the control unit 230 determines whether or not a base station is present in which there is an open time band relating to the reservation request from among the base stations provided with the communication format matching the reservation conditions relating to the reservation request. That is, it is determined whether or not a base station is present in which there is an open time band relating to the reservation request based on the reservation information stored in the reservation information storage unit 260. For example, as shown in FIG. 4, since all five slots are reserved in the base station (base station ID: AP001) in the time band of 2nd April (Sat) from 23:00 to 24:00, it is determined that the time band relating to the reservation request is not open. Meanwhile, since the time band of 2nd April (Sat) from 10:00 to 14:30 has one or two open slots, it is determined that the time band relating to the reservation request is open.

Subsequently, when there are base stations in which a time band relating to the reservation request is open, the control unit 230 selects the base station best matching the reservation conditions relating to the reservation request from among the base stations. For example, in a case where there is only one base station in which a time band relating to the reservation request is open, that base station is selected. Further, in a case where there is a plurality of base stations in which a time band relating to the reservation request is open, the base station best matching the reservation conditions relating to the reservation request is selected from the plurality of base stations. For example, as the reservation conditions relating to the reservation request, in a case where a base station with a fast communication speed is to be set, the base station with the fastest communication speed is selected from among the plurality of base stations.

Further, if there is no station in which a time band relating to the reservation request is open, the control unit 230 determines that a reservation relating to the reservation request has not been established. In this manner, a reservation process is performed for the reservation request received from the wireless communication apparatus 300.

Here, this example shows the performance of a reservation process for a reservation request immediately after the reservation request is received; however, it is also possible to respectively perform reservation processes of predetermined types (for example, an auction type) for a plurality of reservation requests received within a certain time. For example, the information processing apparatus 200 transmits reservation information including the lowest use fee for the base stations by frequency band, time band, and place and the cancellation fee to each wireless communication apparatus, and displays the information thereon. Then, bidding is performed in a period designated by the information processing apparatus 200, whereby it becomes possible for the wireless communication apparatus offering the highest fee to set the connection rights in the frequency band, time band, and place.

Subsequently, when the reservation process is finished (614), the communication control unit 220 transmits the reservation result information including the result to the wireless communication apparatuses 300 through the first network control apparatus 110 (615 to 618).

Upon receiving the reservation result information from the information processing apparatus 200 (618), the control unit 330 of the wireless communication apparatus 300 displays the reservation registration screen on the display unit 350 based on the reservation result information (619). This display example is shown in FIGS. 9 and 11.

FIG. 9 shows an example of a display screen (reservation registration screen 530) displayed on the display unit 350 when the reservation result information is received from the information processing apparatus 200. The reservation registration screen 530 is a display screen for performing registration for confirming the reservation when the reservation has been established with respect to the reservation request. Specifically, the reservation registration screen 530 displays a place display region 531, a time display region 532, a communication expenses display region 533, a registration button 534, a correction button 535, and a cancellation fee button 536.

The place display region 531 is a region displaying a place where communication is to be performed using the wireless communication apparatus 300 (place which may be reserved). That is, the place display region 531 displays contents designated in the place designation region 510 shown in FIG. 8.

The time display region 532 is a region displaying a time band in which communication is to be performed using the wireless communication apparatus 300 (time band which may be reserved). That is, the time display region 532 displays contents designated in the time designation region 520 shown in FIG. 8.

The communication expenses display region 533 is a region displaying communication expenses applying to the case in which communication is to be performed using the wireless communication apparatus 300. That is, the communication expenses display region 533 displays contents designated in the communication expenses designation region 525 shown in FIG. 8.

The registration button 534 is a button to be pressed when formally registering the reservation contents displayed on the reservation registration screen 530. When the registration button 534 is pressed, the reservation registration information including the reservation contents displayed on the reservation registration screen 530 is transmitted to the information processing apparatus 200 and the registration process is performed for the reservation contents displayed on the reservation registration screen 530.

The correction button 535 is a button to be pressed when correcting a part of the reservation contents displayed on the reservation registration screen 530. After the correction button 535 is pressed, the user may correct a part of the reservation contents displayed on the reservation registration screen 530. This correction, for example, may make corrections within the range of the reservation contents displayed on the reservation registration screen 530. For example, it is possible to perform correction limiting the place which is displayed in the place display region 531 or correction limiting the time band which is displayed in the time display region 532. In a case where correction is performed with respect to a part of the reservation contents in this manner, a reservation request relating to the contents after correction is transmitted to the information processing apparatus 200 and a new reservation process is performed.

The cancellation fee button 536 is a button which is pressed when confirming the cancellation fee generated when performing cancellation after formal registration (reservation registration) of the reservation contents displayed on the reservation registration screen 530. When the cancellation fee button 536 is pressed, the cancellation fee display screen 537 shown in FIG. 10 is displayed.

FIG. 10 shows an example of a display screen (cancellation fee display screen 537) displayed on the display unit 350 when the cancellation fee button 536 is pressed in the reservation registration screen 530. The cancellation fee display screen 537 is a display screen displaying the cancellation fee generated when cancelling the reservation after reservation registration is performed. Specifically, the cancellation fee display screen 537 displays a list of cancellation fees in each period, and the return button 538.

FIG. 11 shows an example of a display screen (cancellation waiting list reservation registration screen 540) displayed on the display unit 350 when the reservation result information is received from the information processing apparatus 200. The cancellation waiting list reservation registration screen 540 is a display screen for performing registration of a cancellation waiting list relating to the reservation in a case where the reservation relating to the reservation request was not established. Specifically, cancellation waiting list reservation registration screen 540 displays a place display region 541, a time display region 542, a plan display region 543, a cancellation waiting list registration button 544, and a finish button 545.

The place display region 541 is a region for displaying a place where communication is to be performed using the wireless communication apparatus 300 (place where reservation cancellation is performed). That is, the place display region 541 displays contents designated in the place designation region 510 shown in FIG. 8.

The time display region 542 is a region displaying a time band in which communication is to be performed using the wireless communication apparatus 300 (time band in which reservation cancellation is performed). That is, the time display region 542 displays contents designated in the time designation region 520 shown in FIG. 8.

The plan display region 543 is a region displaying a plan applying to the case in which communication is to be performed using the wireless communication apparatus 300. That is, the plan display region 543 displays contents designated in the communication expenses designation region 525 shown in FIG. 8.

The cancellation waiting list registration button 544 is a button to be pressed when formally registering the reservation contents displayed on the cancellation waiting list reservation registration screen 540. When the cancellation waiting list registration button 544 is pressed, the cancellation waiting list reservation registration information including the reservation contents displayed on the cancellation waiting list reservation registration screen 540 is transmitted to the information processing apparatus 200. Next, a cancellation waiting list registration process is performed for the reservation contents displayed on the cancellation waiting list reservation registration screen 540.

The finish button 545 is a button to be pressed when changing the cancellation waiting list reservation registration screen 540 to another display screen.

Here, description will be given with respect to a case where a reservation relating to a reservation request was established. In a case where a reservation relating to a reservation request is established, the control unit 330 of the wireless communication apparatus 300 displays a reservation registration screen (reservation registration screen 530 shown in FIG. 9) on a display unit 350 based on the reservation result information (619). In the reservation registration screen 530, when the registration button 534 is pressed, the communication control unit 310 transmits the reservation registration information including the reservation contents displayed on the reservation registration screen 530 to the information processing apparatus 200 (620 to 623). That is, the reservation registration information is transmitted from the wireless communication apparatus 300 to the information processing apparatus 200 through the first network control apparatus 110 (620 to 623).

When the information processing apparatus 200 receives the reservation registration information (623), the control unit 230 performs the reservation registration process (624). That is, in the reservation information storage unit 260, the terminal ID of the wireless communication apparatus relating to the reservation registration information is recorded in the time band of the base station relating to the reservation registration information. Further, the respective contents relating to the reservation registration information are recorded in the terminal management information storage unit 270.

In addition, the control unit 330 of the wireless communication apparatus 300 performs a reservation registration process (625) after transmitting the reservation registration information (620). That is, the respective contents relating to the reservation registration information are recorded as setting information in the setting information storage unit 380. The setting information is included in the reservation result information in this manner.

Next, description will be given with respect to a case where a reservation relating to a reservation request was not established. In a case where a reservation relating to a reservation request was not established, the control unit 330 of the wireless communication apparatus 300 displays a reservation registration screen (cancellation waiting list reservation registration screen 540 shown in FIG. 11) on a display unit 350 based on the reservation result information (619). Then, in the cancellation waiting list reservation registration screen 540, when the cancellation waiting list registration button 544 is pressed, the control unit 330 transmits the reservation registration information to the information processing apparatus 200 (620 to 623). That is, the reservation registration information included in the reservation contents displayed on the cancellation waiting list reservation registration screen 540 is transmitted from the wireless communication apparatus 300 to the information processing apparatus 200 through the first network control apparatus 110 (620 to 623).

When the information processing apparatus 200 receives the reservation registration information (623), the control unit 230 performs the reservation registration process (cancellation reservation registration process) (624). Further, the contents relating to the reservation registration information (the cancellation waiting list reservation time 274 and the like shown in FIG. 7) are recorded in the terminal management information storage unit 270.

In addition, the control unit 330 of the wireless communication apparatus 300 performs a reservation registration process (625) after transmitting the reservation registration information (620). That is, the respective contents relating to the reservation registration information are recorded as setting information in the setting information storage unit 380.

[Display Example Relating to Reservation]

FIG. 13 is a diagram showing a display screen example displayed on the wireless communication apparatus 300 in the first embodiment of the present disclosure.

The reservation contents notification screen 550 shown in FIG. 13 is displayed at a predetermined time before a reserved time band (for example, one hour before) based on the setting information stored in the setting information storage unit 380. Specifically, the reservation contents notification screen 550 displays the reservation place display region 551, the reservation time display region 552, the communication expenses display region 553, the return button 554 and the details button 555.

The reservation place display region 551 is a region displaying a reservation place where communication is to be performed using the wireless communication apparatus 300. That is, the reservation place display region 551 displays contents designated in the place designation region 510 shown in FIG. 8.

The reservation time display region 552 is a region displaying a reservation time band in which communication is to be performed using the wireless communication apparatus 300. That is, the reservation time display region 552 displays contents designated in the time designation region 520 shown in FIG. 8.

The communication expenses display region 553 is a region displaying communication expenses applying to the case in which communication is to be performed using the wireless communication apparatus 300. That is, the communication expenses display region 553 displays contents designated in the communication expenses designation region 525 shown in FIG. 8.

The return button 554, for example, is a button to be pressed when returning to the previously displayed display screen.

The details button 555 is a button to be pressed when displaying the details screen including further detailed content with respect to the reservation conditions displayed on the reservation contents notification screen 550. By looking at the details screen displayed after pressing the details button 555, it is possible for the user to confirm the reservation conditions in detail. Further, the details screen is left out of the drawings and description thereof is omitted.

In this manner, it is possible to notify the user of the reservation contents by displaying the reservation contents notification screen 550 on the display unit 350 at a predetermined time before the reserved time band. Accordingly, even in a case where the user forgets the reservation, it is possible to easily grasp the contents of the reservation. Further, the reservation contents notification screen 550 may be set to perform display intermittently at set intervals or may be set to display the map relating to the reservation place at the same time.

[Communication Example Between Each Apparatus During Performing of the Reservation Contents]

Figure 14:
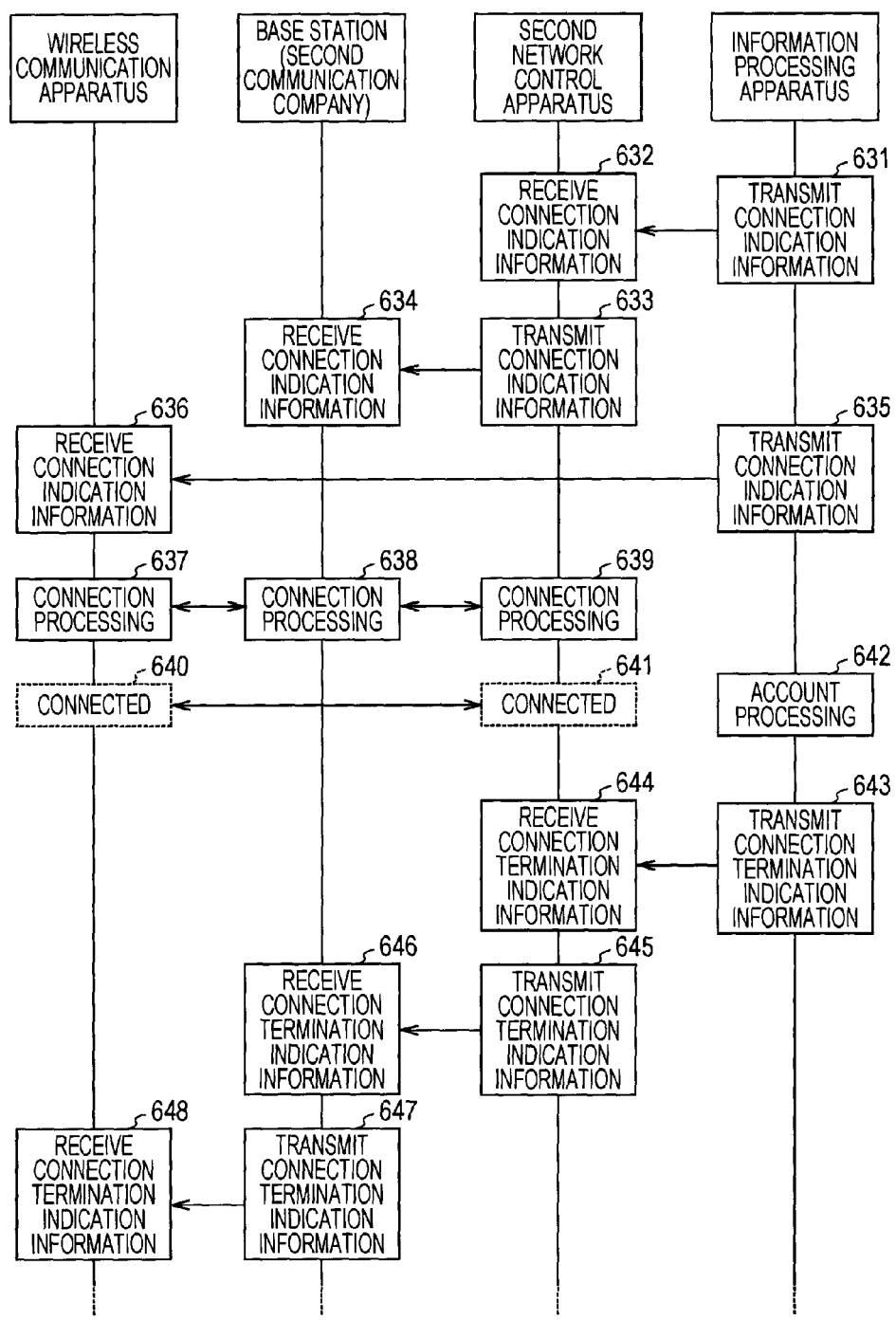
FIG. 14 is a sequence chart showing a communication processing example between each apparatus configuring the communication system in the first embodiment of the present disclosure.

FIG. 14 is a sequence chart showing a communication processing example between each apparatus configuring the communication system 100 in the first embodiment of the present disclosure. In addition, FIG. 14 show a communication processing example in a case where connection rights to connect with a base station managed by a second communication company are reserved. That is, FIG. 14 shows an example of connecting to a base station (for example, the base station 121 shown in FIG. 2) managed by the second communication company in a case where the wireless communication apparatus 300 holds USIM information relating to the first communication company. Further, the base station shown in FIG. 14 is managed by the second communication company.

The control unit 230 of the information processing apparatus 200 monitors whether or not the reservation time (start time) relating to the reservation registration performed by the wireless communication apparatus 300 has been reached based on the contents of the reservation information storage unit 260 and the terminal management information storage unit 270. Then, when the reservation time has been reached, the control unit 230 transmits the connection indication information to the base station relating to the reservation registration through the second network control apparatus 120 (631 to 634). Further, the control unit 230 transmits connection indication information to the wireless communication apparatus 300 relating to the reservation registration through the first network control apparatus 110 (635 and 636). Here, the connection indication information is information indicating the start of the connection process between the base station relating to the reservation registration and the wireless communication apparatus, and includes setting information.

Subsequently, the connection process between the wireless communication apparatus 300, the base station and the second network control apparatus 120 relating to the reservation registration is performed (637 to 639). In the connection process, first, the control unit 330 of the wireless communication apparatus 300 sets valid USIM information relating to the second communication company. For example, in a case where valid USIM information relating to the second communication company is set by a USIM information validation process, the control unit 330 performs a validation process of USIM information in the USIM information rewriting unit 360. Further, for example, it is assumed that the valid USIM information relating to the second communication company is included and that the USIM information included in the connection indication information is used. In such a case, the control unit 330 performs a rewriting process on the valid USIM information relating to the second communication company in the USIM information rewriting unit 360.

Here, a case where the wireless communication apparatus 300 is not present in the reservation place is also assumed. In such a case, the control unit 230 continues monitoring until a certain time passes from the start time, and, in a case where the wireless communication apparatus 300 does not move to the reservation place within the certain time, performs an error process.

Further, when the connection process is finished (637 to 639), a communication process is performed between the wireless communication apparatus 300 and the second network control apparatus 120 through the base station relating to the reservation registration (640 and 641). In such a case, the control unit 230 of the information processing apparatus 200 performs a billing process based on the billing information (billing information stored in the billing information storage unit 280) of the second communication company relating to the reservation registration.

The control unit 230 of the information processing apparatus 200 monitors whether or not the finish time relating to the reservation registration performed by the wireless communication apparatus 300 has been reached based on the contents of the reservation information storage unit 260 and the terminal management information storage unit 270. Then, when the finish time has been reached, the control unit 230 transmits the connection termination indication information to the base station relating to the reservation registration through the second network control apparatus 120 (643 to 646). Further, the control unit 230 transmits connection termination indication information to the wireless communication apparatus 300 relating to the reservation registration through the second network control apparatus 120 (647 and 648). Here, the connection termination indication information is information indicating the termination of the connection between the base station and the wireless communication apparatus relating to the reservation registration, and includes USIM information restoration information. The USIM information restoration information is information for restoring the USIM information relating to the second communication company set in the wireless communication apparatus 300 to the USIM information relating to the first communication company. For example, the USIM information stored in the USIM information storage unit 370 (second communication company) is rewritten to the USIM information relating to the first communication company.

Further, when the wireless communication apparatus 300 receives connection termination indication information (648), the USIM information rewriting unit 360 of the wireless communication apparatus 300 rewrites the USIM information stored in the USIM information storage unit 370 based on the connection termination indication information. That is, the USIM information relating to the second communication company is rewritten with the USIM information relating to the first communication company. By the restoration process, the wireless communication apparatus 300 may connect to the first communication company (first network control apparatus 110).

Further, in this example, it is shown that the information processing apparatus 200 transmits connection indication information (setting information) to both of the base station and the wireless communication apparatus relating to the reservation registration. However, since setting information is held in advance in the base station and the wireless communication apparatus relating to the reservation registration, when the reservation time relating to the reservation registration is reached, it is possible to for the base station and the wireless communication apparatus relating to the reservation registration to respectively start the connection process. Further, it may be that the setting information is held in advance in any one of the base station and the wireless communication apparatus relating to the reservation registration and that the connection indication information is set to be transmitted to the other one, whereby the respective connection processes are started. Further, the same applies to the connection termination indication information.

Moreover, it may be assumed that the wireless communication apparatus 300 and the base station do not start at the reservation time and in the reservation place. In such a case, for example, a start command (for example, a command turning on the power) may be respectively transmitted from the information processing apparatus 200 in order to perform the starting. Further, by the setting of the communication module, information relating to the certification and the billing may be set to be transmitted to the wireless communication apparatus 300 from the information processing apparatus 200. In this manner, the information processing apparatus 200 transmits commands requesting the turning on of the power, the turning off of the power, and the changing of the operation settings to the wireless communication apparatus 300 and the base station, whereby the information processing apparatus 200 may be set to control each apparatus.

[Operation Example of a Communication System]

Next, description will be given of the operation of a communication system 100 in the first embodiment of the present disclosure with reference to the drawings.

[Operation Example During Reservation]

Figure 15:
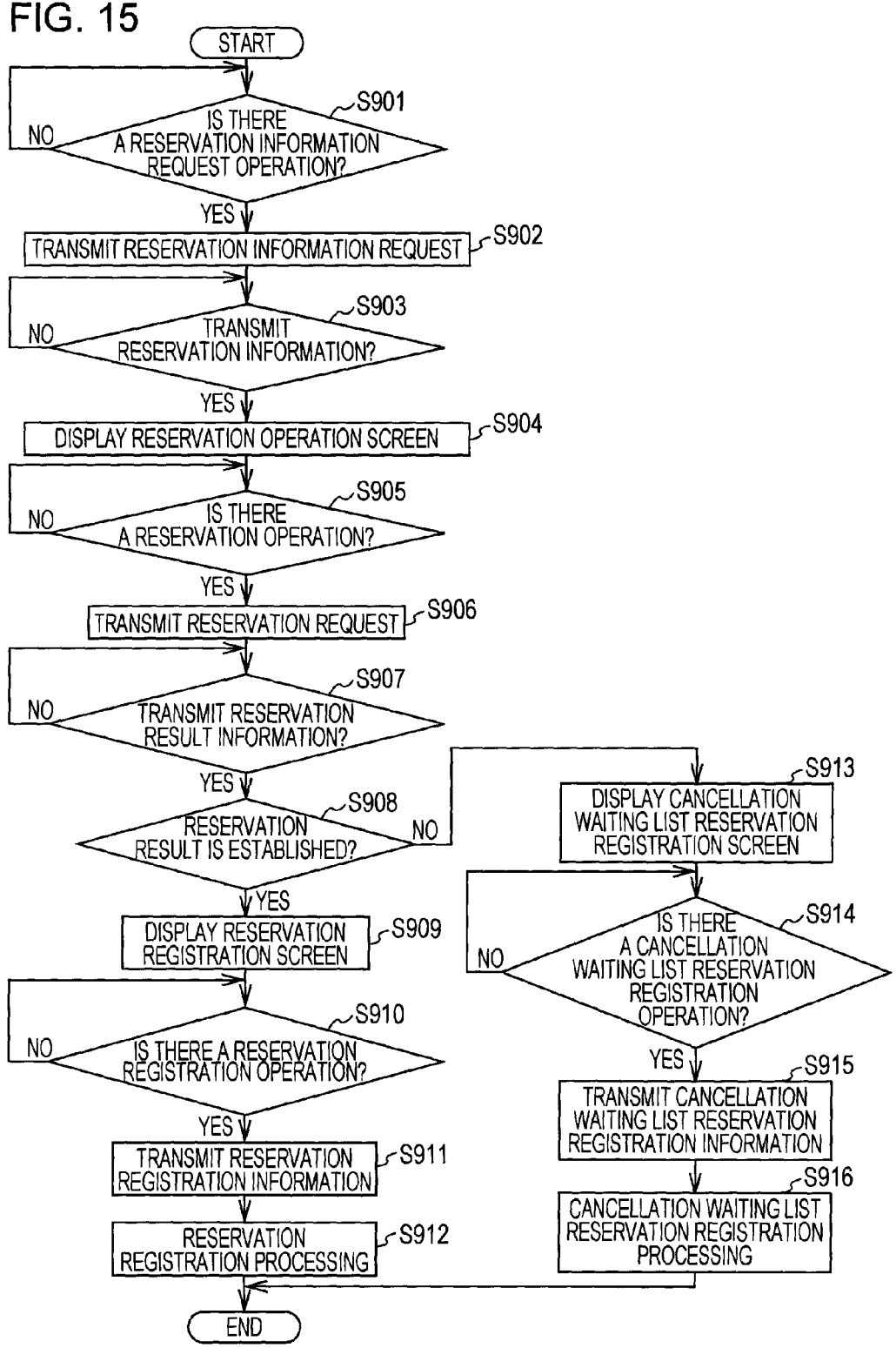
FIG. 15 is a flowchart showing an example of a processing procedure of a connection rights reservation process using the wireless communication apparatus in the first embodiment of the present disclosure.

FIG. 15 is a flowchart showing an example of a processing procedure of a connection rights reservation process using the wireless communication apparatus 300 in the first embodiment of the present disclosure.

First, it is determined whether or not a user operation (request operation) performing a reservation information request for acquiring reservation information used when performing a reservation request has been performed (step S901), and, when the request operation has not been performed, monitoring is continued. On the other hand, when the request operation has been performed (step S901), the communication control unit 310 transmits the reservation information request to the information processing apparatus 200 through the first network control apparatus 110 (step S902).

Subsequently, it is determined whether or not the reservation information has been received from the information processing apparatus 200 (step S903), and, when the reservation information has not been received, monitoring is continued. On the other hand, when the reservation information has been received (step S903), the control unit 330 displays the reservation operation screen (for example, the reservation operation screen 500 shown in FIG. 8) for performing the reservation request on the display unit 350 based on the reservation information (step S904).

Subsequently, it is determined whether or not a reservation operation (for example, the pressing operation of the confirm button 503 (shown in FIG. 8) after the designation operation of the reservation conditions by the user) is performed in the reservation operation screen (step S905), and, when the reservation operation has not been performed, monitoring is continued. On the other hand, when the reservation operation has been performed (step S905), the communication control unit 310 transmits the reservation request relating to the reservation operation to the information processing apparatus 200 through the first network control apparatus 110 (step S906). Here, step S906 is an example of a communication control process according to the scope of the present disclosure.

Subsequently, it is determined whether or not the reservation result information has been received (step S907), and, when the reservation result information has not been received, monitoring is continued. On the other hand, when the reservation result information has been received (step S907), it is determined whether or not the reservation result including the reservation result information is established (reservation established) (step S908).

When the reservation result information is established (step S908), the control unit 330 displays a reservation registration screen (for example, the reservation registration screen 530 shown in FIG. 9) on the display unit 350 (step S909).

Subsequently, it is determined whether or not the reservation registration operation (for example, a pressing operation of the registration button 534) has been performed in the reservation registration screen (step S910), and, when the reservation registration operation has not been performed, monitoring is continued. When the reservation registration operation has been performed (step S910), the communication control unit 310 transmits the reservation registration information including the reservation contents displayed on the reservation registration screen to the information processing apparatus 200 through the first network control apparatus 110 (step S911).

Subsequently, the control unit 330 performs the reservation registration process (step S912). That is, the respective contents relating to the reservation registration information are recorded as the setting information in the setting information storage unit 380 (step S912). The connection rights are set based on the setting information. Further, step S912 is an example of a control process according to the scope of the present disclosure.

Further, when the reservation result is not established (step S908), the control unit 330 displays a cancellation waiting list reservation registration screen (for example, cancellation waiting list reservation registration screen 540 shown in FIG. 11) on the display unit 350 based on the reservation result information (step S913).

Subsequently, it is determined whether or not a cancellation waiting list reservation registration operation (for example, a pressing operation of the cancellation waiting list registration button 544) has been performed in the cancellation waiting list reservation registration screen (step S914), and, when the reservation registration operation has not been performed, monitoring is continued. When the reservation registration operation has been performed (step S914), the communication control unit 310 transmits the cancellation waiting list reservation registration information to the information processing apparatus 200 through the first network control apparatus 110 (step S915). The cancellation waiting list reservation registration information includes the reservation contents displayed on the cancellation waiting list reservation registration screen.

Subsequently, the control unit 330 performs a cancellation waiting list reservation registration process (step S916). That is, the respective contents relating to the cancellation waiting list reservation registration information are recorded as setting information in the setting information storage unit 380 (step S916).

Figure 16:
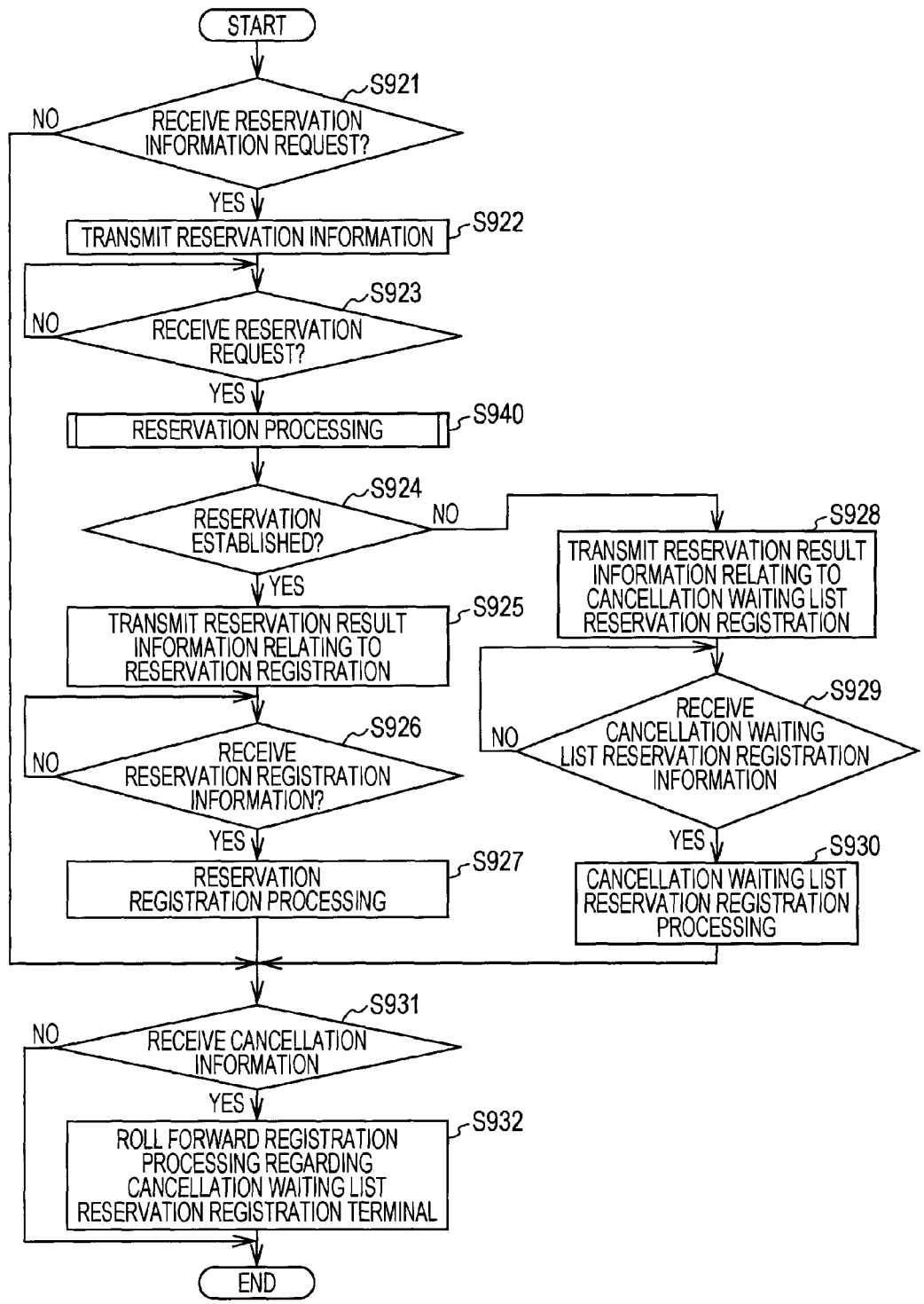
FIG. 16 is a flowchart showing an example of a processing procedure of a connection rights reservation process using the information processing apparatus in the first embodiment of the present disclosure.

FIG. 16 is a flowchart showing an example of a processing procedure of a connection rights reservation process using the information processing apparatus 200 in the first embodiment of the present disclosure.

First, it is determined whether or not the reservation information request has been received from the wireless communication apparatus (step S921), and, when the reservation information request has not been received, the process proceeds to step S931. On the other hand, when the reservation information request has been received (step S921), the communication control unit 220 transmits the reservation information corresponding to the reservation information request through the network control apparatus to the wireless communication apparatus which transmitted the reservation information request (step S922).

Subsequently, it is determined whether or not the reservation request has been received from the wireless communication apparatus (step S923), and, when the reservation request has not been received, monitoring is continued. On the other hand, when the reservation request has been received (step S923), the reservation process is performed (step S940). Detailed description will be given of the reservation process with reference to FIG. 17.

Subsequently, it is determined whether or not the result of the reservation process establishes the reservation (step S924), then, when the result of the reservation process establishes the reservation (step S924), the communication control unit 220 transmits the reservation result information including the result through the network control apparatus to the wireless communication apparatus which transmitted the reservation request (step S925).

Subsequently, it is determined whether or not the reservation registration information has been received (step S926), and, when the reservation registration information has not been received, monitoring is continued. On the other hand, when the reservation registration information has been received (step S926), the control unit 230 performs the reservation registration process (step S927). That is, in the reservation information storage unit 260, the terminal ID of the wireless communication apparatus relating to the reservation registration information is recorded in the time band of the base station relating to the reservation registration information. Further, the respective contents relating to the reservation registration information are recorded in the terminal management information storage unit 270.

Further, when the result of the reservation process does not establish the reservation (step S924), the communication control unit 220 transmits the reservation result information including the result through the network control apparatus to the wireless communication apparatus which transmitted the reservation request (step S928).

Subsequently, it is determined whether or not the cancellation waiting list reservation registration information has been received (step S929), and, when the cancellation waiting list reservation registration information has not been received, monitoring is continued. On the other hand, when the cancellation waiting list reservation registration information has been received (step S929), the control unit 230 performs a cancellation waiting list reservation registration process (step S930). That is, the respective contents relating to the cancellation waiting list reservation registration information are recorded in the terminal management information storage unit 270.

Subsequently, it is determined whether or not the cancellation information has been received from the wireless communication device (step S931), and, when the cancellation information has not been received, the operation of the reservation process is finished. On the other hand, when the cancellation information has been received (step S931), the control unit 230 performs roll forward registration processing with respect to the wireless communication apparatus of the cancellation waiting list reservation registration (step S932). That is, in the reservation information storage unit 260, the terminal ID of the wireless communication apparatus relating to the cancellation information is deleted from the time band of the base station relating to the cancellation information. Then, the wireless communication apparatus (the apparatus with the highest priority among the apparatuses matching the reservation conditions (for example, the apparatus with the earliest reservation time)) of the cancellation waiting list reservation registration is recorded in the deleted time band. Further, the respective contents relating to the reservation registration information are recorded in the terminal management information storage unit 270.

In this manner, the setting information for setting the connection rights relating to the cancellation information is transmitted to the wireless communication apparatus of the cancellation waiting list reservation registration. In such a case, when the reservation time relating to the received cancellation information (start time) is reached, the wireless communication apparatus of the cancellation waiting list reservation registration may be quickly replaced by communication with the desired base station based on the setting information.

Figure 17:
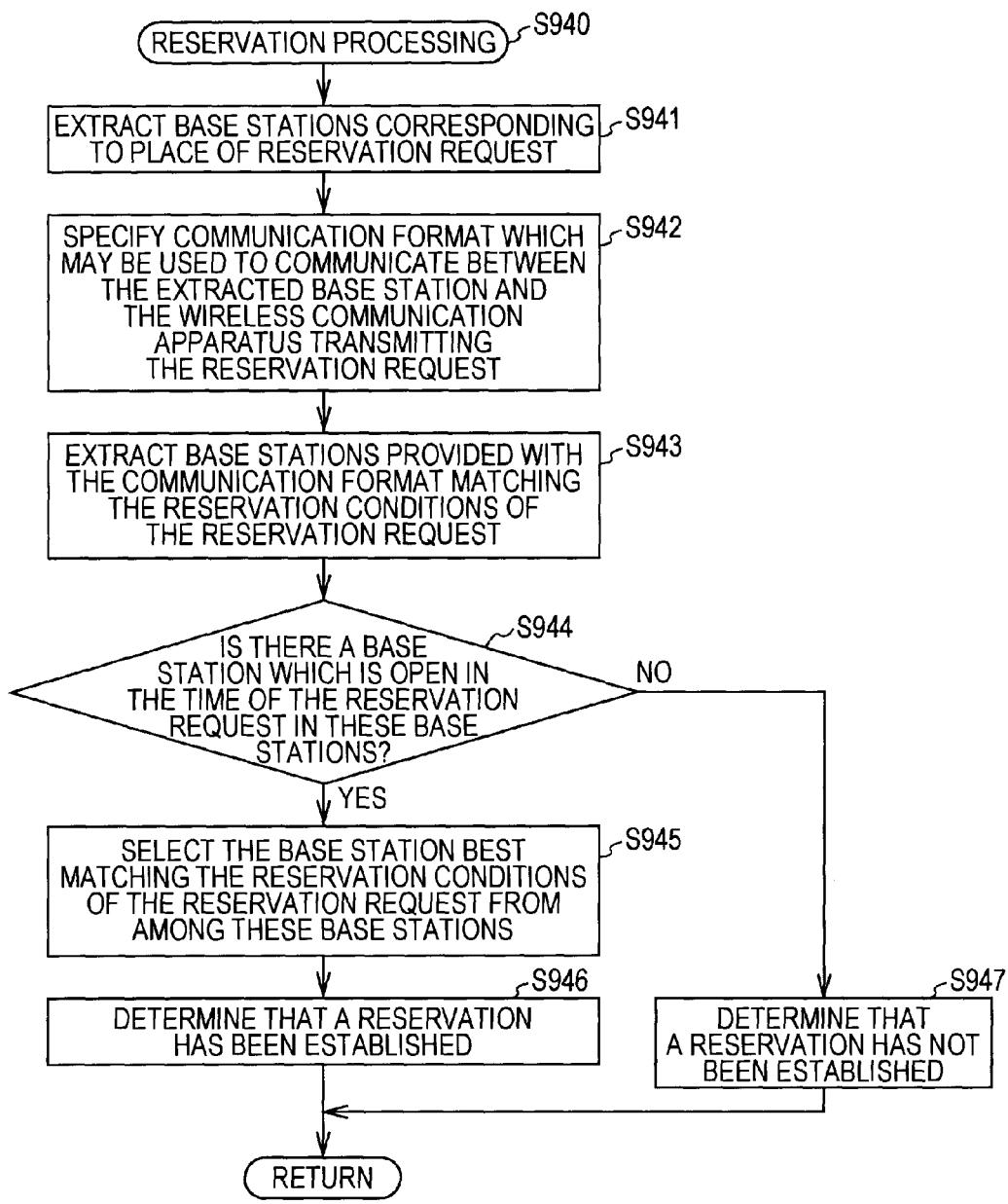
FIG. 17 is a flowchart showing a reservation processing procedure among the processing procedures of a connection rights reservation process using the information processing apparatus in the first embodiment of the present disclosure.

FIG. 17 is a flowchart showing a reservation processing procedure (the processing procedure of step S940 shown in FIG. 16) among the processing procedures of a connection rights reservation process using the information processing apparatus 200 in the first embodiment of the present disclosure.

First, the control unit 230 extracts a base station corresponding to the reservation place included in the received reservation request based on the base station information stored in the base station information storage unit 250 (step S941). That is, base stations (one or a plurality of base stations) for which the reservation place included in the received reservation request is included inside the cells are extracted (step S941).

Subsequently, the control unit 230 specifies the communication format which may be used for communication between the extracted base station and the wireless communication apparatus 300 which transmitted the reservation request (step S942). That is, a communication format which matches the communication format which the extracted base station may use to communicate and the communication format which the wireless communication apparatus 300 which transmitted the reservation request may use to communicate is specified. Further, information relating to the communication format which the wireless communication apparatus 300 which transmitted the reservation request may use to communicate is included in the reservation request.

Subsequently, the control unit 230 extracts a base station provided with a communication format matching the reservation conditions relating to the reservation request (for example, communication speed, or communication expenses) from the base stations (base stations extracted in step S941) corresponding to the reservation place (step S943). That is, a base station provided with a communication format matching the reservation conditions relating to the reservation request is extracted from the base stations provided with the specified communication format in step S942.

Subsequently, the control unit 230 determines whether or not a base station is present in which there is an open time band relating to the reservation request from among the base stations (base stations extracted in step S943) provided with the communication format matching the reservation conditions relating to the reservation request (Step S944). That is, it is determined whether or not a base station is present in which there is an open time band relating to the reservation request based on the reservation information stored in the reservation information storage unit 260.

Subsequently, when there are base stations in which a time band relating to the reservation request is open (step S944), the control unit 230 selects the base station best matching the reservation conditions relating to the reservation request from among the base stations (step S945). In such a case, it is determined that a reservation relating to the reservation request has been established (step S946).

Further, when there is no base station in which a time band relating to the reservation request is open (step S944), the control unit 230 determines that the reservation relating to the reservation request is not established (step S947).

[Operation Example During Reservation Performance]

Figure 18:
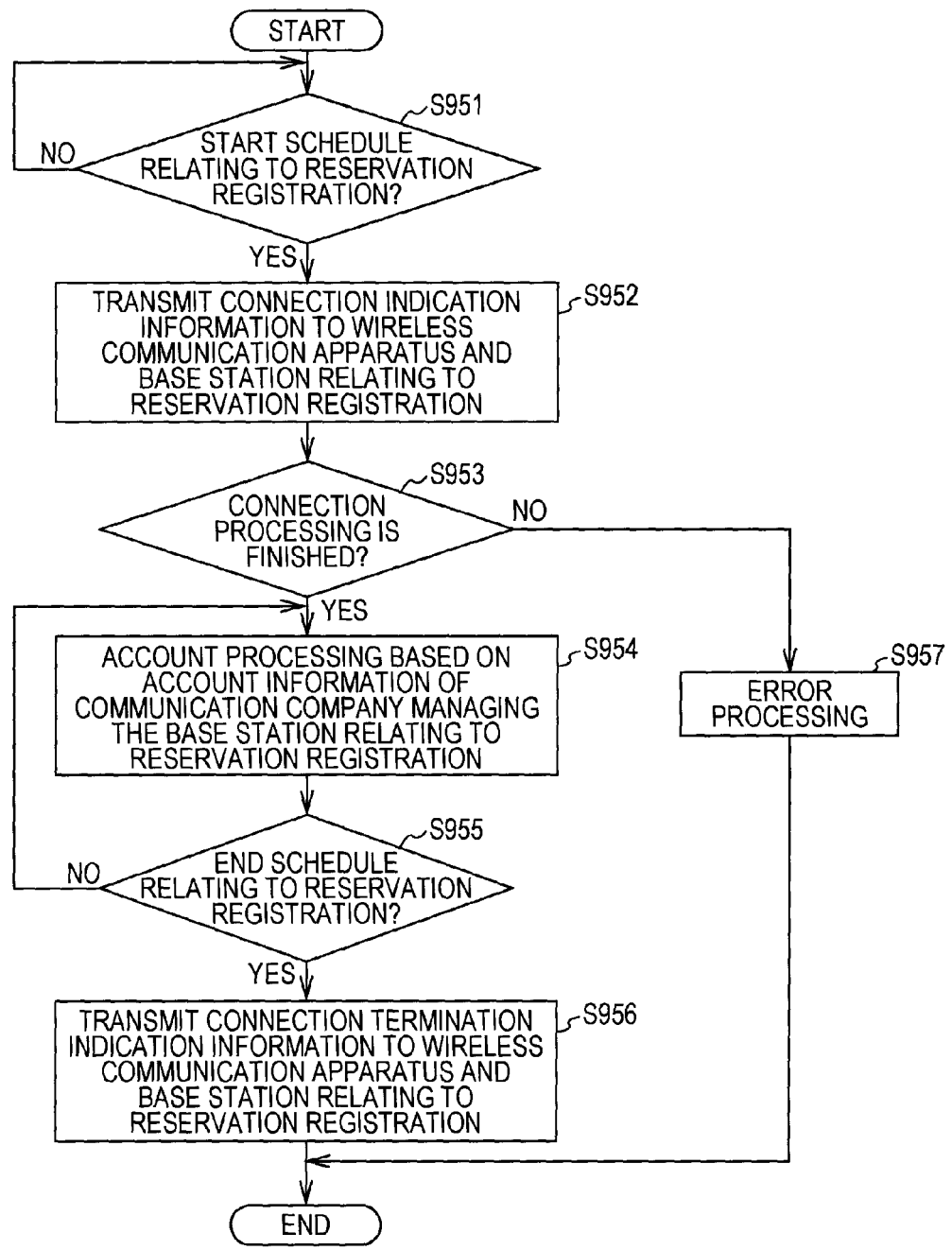
FIG. 18 is a flowchart showing an example of a processing procedure of a communication process using the information processing apparatus in the first embodiment of the present disclosure.

FIG. 18 is a flowchart showing an example of a processing procedure of a communication process using the information processing apparatus 200 in the first embodiment of the present disclosure.

First, the control unit 230 determines whether or not the reservation time (start time) relating to the reservation request has been reached (step S951), and, when the reservation time has not been reached, monitoring is continued. On the other hand, when the reservation time has been reached (step S951), the communication control unit 220 transmits the connection indication information to the base station and wireless communication apparatus relating to the reservation registration (step S952).

Subsequently, it is determined whether or not the connection process between the wireless communication apparatus, the base station, and the network control apparatus relating to the reservation registration was completed (step S953), and, when the connection process was not complete, an error process is performed (step S957). For example, when the wireless communication apparatus relating to the reservation registration is not present in the reservation place, it is determined that the connection process was not completed after a certain time has passed from the start time, and the error process is performed.

Further, when the connection process was completed (step S953), the communication process is performed between the wireless communication apparatus and the network control apparatus through the base station relating to the reservation registration. In such a case, the control unit 230 performs the billing process based on the billing information of the communication company relating to the reservation registration (billing information stored in the billing information storage unit 280) (step S954).

Subsequently, the control unit 230 determines whether or not the finish time relating to the reservation registration has been reached (step S955), and, when the finish time has not been reached, returns to step S954. On the other hand, when the finish time has been reached (step S955), the communication control unit 220 transmits the connection termination indication information through the network control apparatus to the base station and the wireless communication apparatus relating to the reservation registration (step S956).

Figure 19:
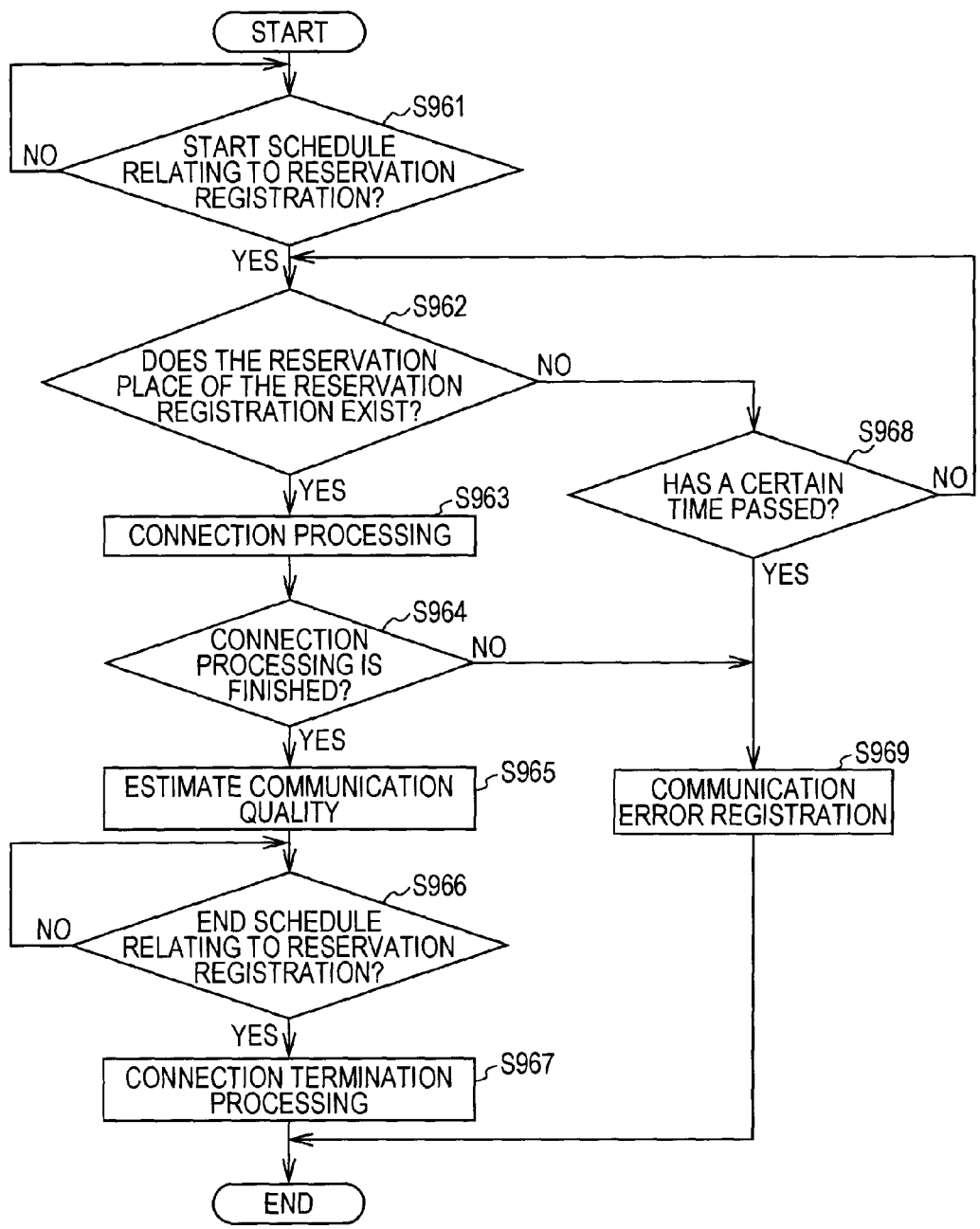
FIG. 19 is a flowchart showing an example of a processing procedure of a communication process using the wireless communication apparatus in the first embodiment of the present disclosure.

FIG. 19 is a flowchart showing an example of a processing procedure of a communication process using the wireless communication apparatus 300 in the first embodiment of the present disclosure. FIG. 19 shows an example in which the wireless communication apparatus 300 automatically performs the connection process when the reservation time (start time) relating to the reservation registration is reached.

First, the control unit 330 determines whether or not the reservation time (start time) relating to the reservation registration has been reached (step S961) based on the setting information stored in the setting information storage unit 380, and, when the reservation time has not been reached, monitoring is continued. On the other hand, when the reservation time has been reached (step S961), the control unit 330 determines whether or not the wireless communication apparatus 300 is present in the reservation place based on the position information acquired from the position information acquisition unit 320 (step S962). That is, it is determined whether or not the position of the position information acquired from the position information acquisition unit 320 is included in the reservation place specified using the setting information stored in the setting information storage unit 380.

When the wireless communication apparatus 300 is not present in the reservation place (step S962), it is determined whether or not a certain time has passed from when the reservation time (start time) relating to the reservation registration was reached (step S968), and, when the certain time has not passed, the process returns to step S962. Further, when the certain time has passed (step S968), the control unit 330 performs communication error registration (step S969) and finishes the operation of the communication process.

Further, when the wireless communication apparatus 300 is present in the reservation place (step S962), the control unit 330 performs the connection process between the base station and the network control apparatus relating to the reservation registration (step S963).

Subsequently, it is determined whether or not the connection process between the base station and the network control apparatus relating to the reservation registration has been completed (step S964), and, when the connection process has not been completed, the process returns to step S969. On the other hand, when the connection process has been completed (step S964), the communication quality is measured (step S965) and it is confirmed whether or not the reservation conditions are satisfied. Here, a base station satisfying the reservation conditions is selected as the base station which is the connection target; however, it may be assumed that the communication quality does not satisfy the reservation conditions for some reason. Here, when the result of the measurement of the communication quality satisfies the reservation conditions, the communication process is continued; however, when the reservation conditions are not satisfied, the communication process may be set to finish by a user operation or automatically. For example, when the result of the measurement of the communication quality does not satisfy the reservation conditions, the control unit 330 provides notification to this effect to the user (for example, displaying the notification on the display unit 350, or outputting the notification using audio), and requests a decision on whether or not the communication process is to continue being performed. Then, based on the user operation after the notification, the control unit 330 performs continuation of the communication process, or the finish process of the communication process.

Subsequently, it is determined whether or not the finish time relating to the reservation registration has been reached (step S966), and, when the finish time has not been reached, monitoring is continued. On the other hand, when the finish time has been reached (step S966), the control unit 330 performs the connection termination process (step S967).

In addition, after completing the connection process, it may be assumed that the wireless communication apparatus 300 moves outside the reservation place. In such a case, processing is performed based on the reservation conditions. For example, when the wireless communication apparatus 300 has moved outside the reservation place, the communication based on the connection rights is terminated, and may be replaced with the communication based on the original connection rights. Further, for example, when the wireless communication apparatus 300 has moved outside the reservation place, instead of maintaining the communication based on the connection rights, the billing information may be replaced so that the communication fee is increased.

In this manner, according to the first embodiment of the present disclosure, it is possible to provide a suitable wireless connection service at a place and timing desired by a user. For example, when it is desired to connect to a base station for which the number of wireless communication apparatuses that may connect thereto is limited in a desired time band, such a reservation may be easily performed. Further, when the reserved connection rights are used in this manner, even when the communication companies are different, it is possible to perform the billing appropriately according to the reserved connection rights since the information processing apparatus 200 performs the billing process. Further, since it is possible to perform cancellation waiting list reservation registration, it is possible to appropriately set the connection rights for another user performing cancellation waiting list reservation registration even in a case where the user performing the reservation may not use the connection rights exactly as in the reservation.

2. Second Embodiment

In the first embodiment of the present disclosure, an example was shown in which a user designates the place and the like by a manual operation to perform reservation of the connection rights. However, it is possible to automatically perform the designation process of the place and the like in which only specific reservation conditions are designated in advance. Here, in the second embodiment of the present disclosure, an example of performing the reservation process automatically will be shown. Further, the configuration of the communication system in the second embodiment of the present disclosure is substantially the same as that of the examples shown in FIG. 2 and the like. For this reason, portions which are common to the first embodiment of the present disclosure are denoted with the same reference numerals and description thereof will be partially omitted.

[Configuration Example of Information Processing Apparatus]

Figure 20:
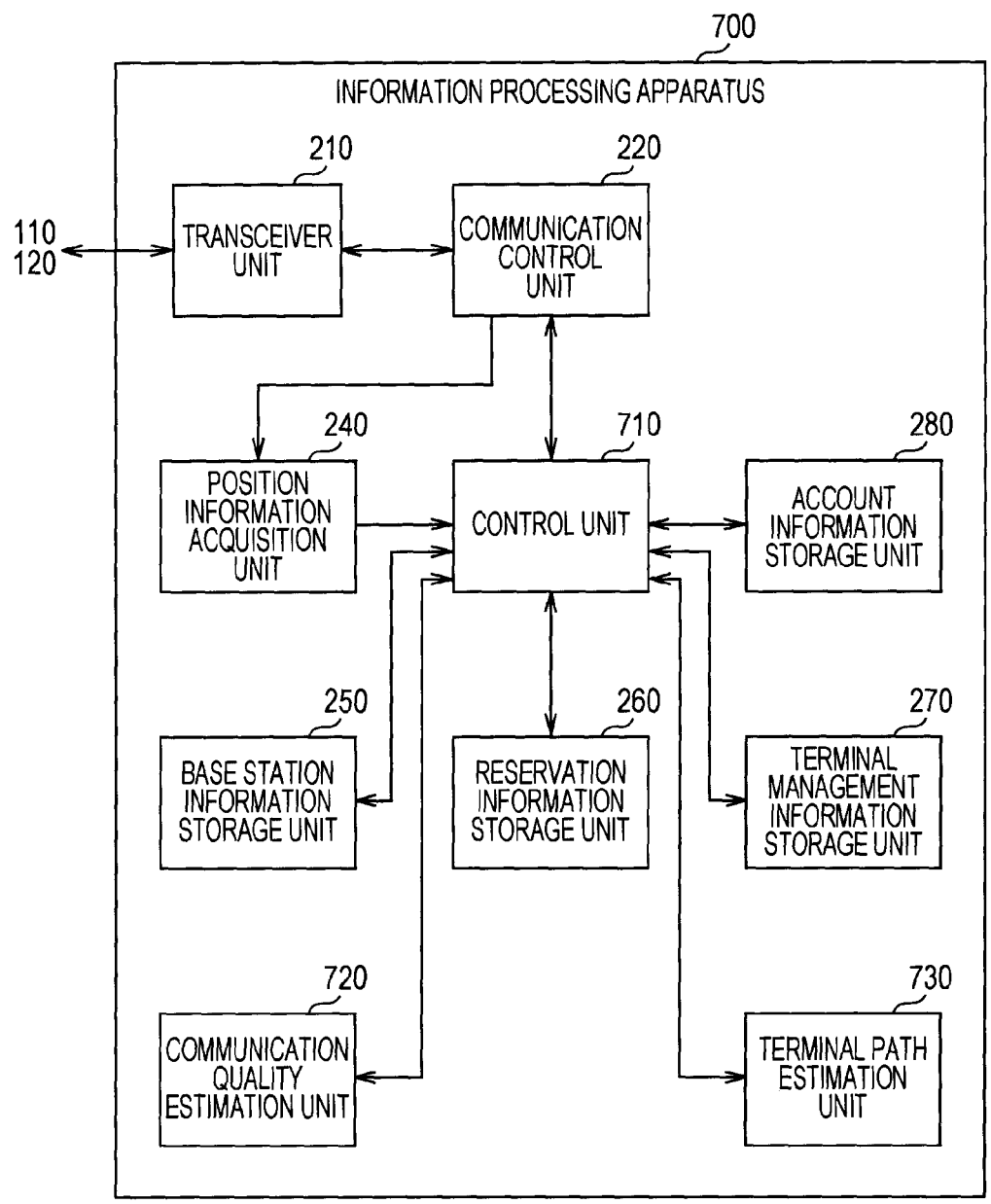
FIG. 20 is a block diagram showing a function configuration example of the information processing apparatus in the second embodiment of the present disclosure.

FIG. 20 is a block diagram showing a function configuration example of the information processing apparatus 700 in the second embodiment of the present disclosure. Further, the information processing apparatus 700 is a modification of the information processing apparatus 200 shown in FIG. 3. For this reason, portions which are common to the information processing apparatus 200 are denoted with the same titles and description thereof will be partially omitted.

The information processing apparatus 700 is provided with control unit 710, a communication quality estimation unit 720, and a terminal path prediction unit 730.

The communication quality prediction unit 720 estimates the communication speed in the case where the wireless communication apparatus performs communication with a specific base station based on the information of the radio wave state obtained from the wireless communication apparatus which transmitted the reservation request, and outputs the estimation result to the control unit 710.

Terminal path estimation unit 730 estimates the movement path of the wireless communication apparatus which transmitted the reservation request, and outputs the estimation result to the control unit 710. For example, the terminal path estimation unit 730 calculates the previous movement path (previous path history) of each wireless communication apparatus based on position information of each wireless communication apparatus acquired from the position information acquisition unit 240, and holds the previous path history for each wireless communication apparatus. Then, the terminal path estimation unit 730 estimates the movement path of the wireless communication apparatus which transmitted the reservation request based on the held previous path history (the previous path history of the wireless communication apparatus which transmitted the reservation request), and the current position of the wireless communication apparatus which transmitted the reservation request. Furthermore, the current position of the wireless communication apparatus which transmitted the reservation request is calculated based on the position information acquired from the position information acquisition unit 240. For example, a case may be assumed in which the wireless communication apparatus which transmitted the reservation request is moved on a path corresponding to the previous path history on weekdays (a predetermined time band (for example, a time band of going to work)). In such a case, the user who owns the wireless communication apparatus may be assumed to be moving on a commuting path. Thus, in such a case, it may be estimated that the wireless communication apparatus is moving in the direction toward the company based on the previous path history.

In addition, using the movement path estimated in this manner and the reception quality of the signal from the base station at the current point of time, it is possible to estimate the communication speed on the estimated future path of the wireless communication apparatus. Further, by referencing the communication speed history generated by other wireless communication apparatuses on the estimated path, it is possible to estimate the communication speed in more detail.

The control unit 710 performs the setting of the estimated place where the connection rights are to be set based on the respective information (estimation result) output from the communication quality estimation unit 720 and the terminal path estimation unit 730. For example, the control unit 710 extracts a base station (base station present on the estimated movement path) which is different from the base station (base station corresponding to the current position) present on the movement path estimated by the terminal path estimation unit 730. In addition, the control unit 710 specifies one base station from among the plurality of extracted base stations based on the level of crowding, the SIR (Signal to Interference Ratio), or the communication expenses. Then, the control unit 710 calculates the planned time at which the wireless communication apparatus 300 will move to the cell of the specified base station, and performs the reservation process for reserving the connection rights for connecting to the base station at the planned time. In such a case, when the communication company managing the specified base station is different than the communication company managing the base station to which the wireless communication apparatus 300 is connected, change of the connection rights (for example, rewriting of the USIM information) is instructed before the handover to the wireless communication apparatus 300 is instructed.

In addition, a calculation unit calculating the movement estimated path of the wireless communication apparatus 300, a specification unit specifying the base station to reserve wireless resources, and a calculation unit calculating the planned time for being in the service area of the base station may be respectively provided on the wireless communication apparatus 300 side. In such a case, it is possible to provide notification of the base station to reserve the resources and the time from the wireless communication apparatus 300 side to the information processing apparatus 700 side.

[Display Example During Reservation Condition Setting]

Figure 21:
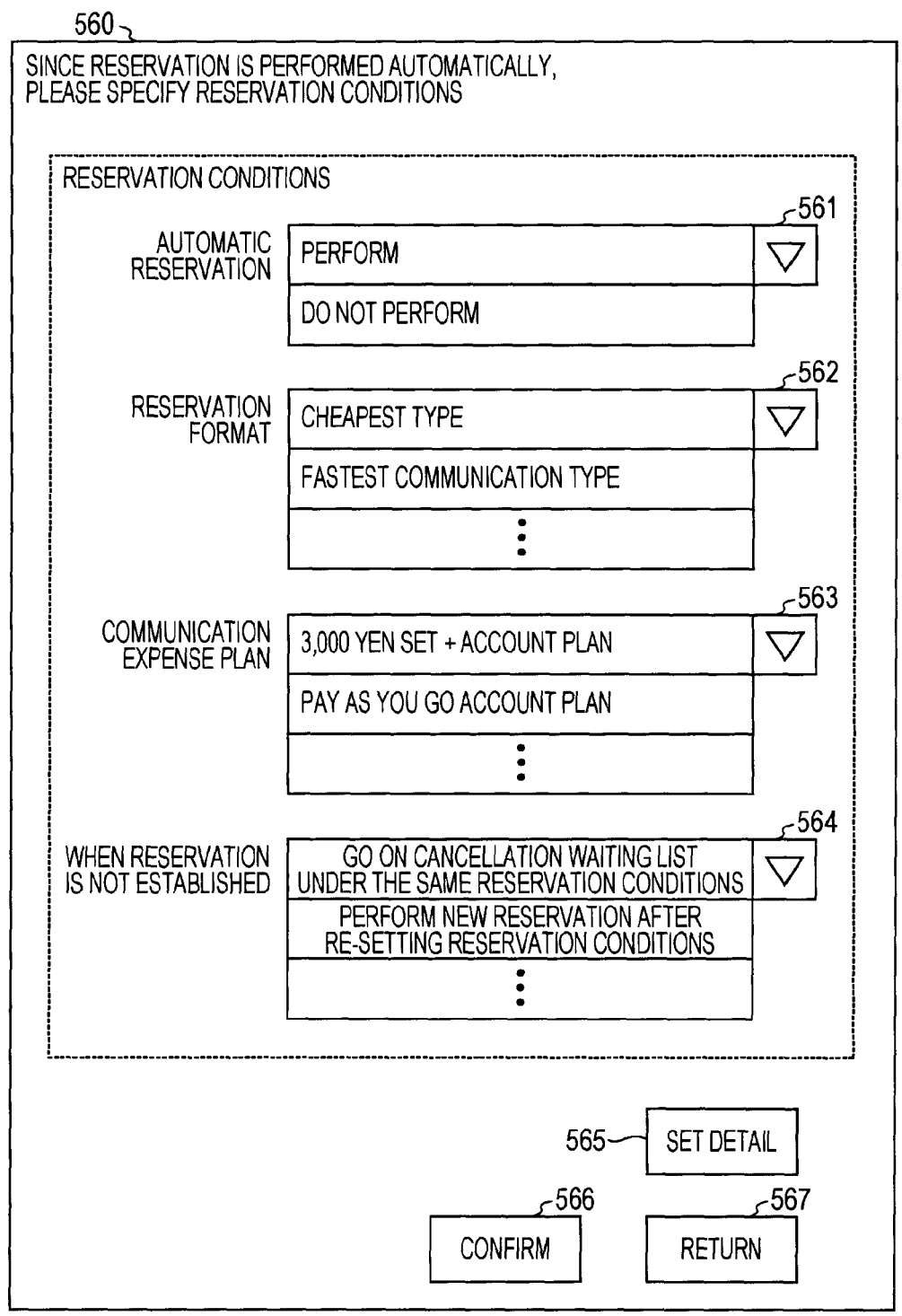
FIG. 21 is a diagram showing a display screen example displayed on the wireless communication apparatus in the second embodiment of the present disclosure.

FIG. 21 is a diagram showing a display screen example displayed on the wireless communication apparatus 300 in the second embodiment of the present disclosure. The reservation operation screen 560 shown in FIG. 21 is, for example, displayed on the display unit 350 when the reservation information is received from the information processing apparatus 700.

The reservation operation screen 560 is a display screen for designating the reservation conditions desired by the user (reservation format, communication expenses plan and the like), and performing reservation of connection rights corresponding to the designated reservation conditions. Specifically, the reservation operation screen 560 displays an automatic reservation designation region 561, a reservation format designation region 562, a communication expenses plan designation region 563, a designation region 564 corresponding to when the reservation is not established, a details setting button 565, a confirm button 566, and a return button 567.

The automatic reservation designation region 561 is for designating whether or not automatic reservation is to be performed. For example, it is possible to display "perform" and "do not perform" when a pull down button is pressed, and to designate whether or not automatic reservation is performed.

The reservation format designation region 562 is for setting the reservation conditions of the automatic reservation desired by the user and designating the reservation format. For example, it is possible to display a list of reservation formats such as "cheapest type", "fastest communication type", and the like when a pull down button is pressed, and to designate the reservation format (one or a plurality) desired by the user.

The communication expenses plan designation region 563 is for setting the reservation conditions of the automatic reservation desired by the user and designating the communication expenses plan. For example, it is possible to display a list of communication expenses plans when a pull down button is pressed, and to designate the plan desired by the user.

The designation region 564 corresponding to when the reservation is not established is for designation corresponding to a case where the reservation at the time of the setting of the automatic reservation was not established. For example, it is possible to display a list of respective measures when a pull down button is pressed, and to designate a measure when the reservation was not established.

The details setting button 565 is a button to be pressed when displaying the details setting screen for performing setting of the details according to a user operation, with respect to the reservation conditions desired by the user (reservation format, communication expenses plan and the like). By performing the details setting of the reservation conditions using the details setting screen displayed after pressing the details setting button 565, it is possible to set the details of the reservation conditions desired by the user. Here, the details setting screen is left out of the drawings and description thereof is omitted.

The confirm button 566 is a button to be pressed when confirming the operation content after operation input (input operation, selection operation, and the like) is performed in the reservation operation screen 560.

The return button 567, for example, is a button to be pressed when returning to the previously displayed display screen.

[Operation Example of Information Processing Apparatus]

Figure 22:
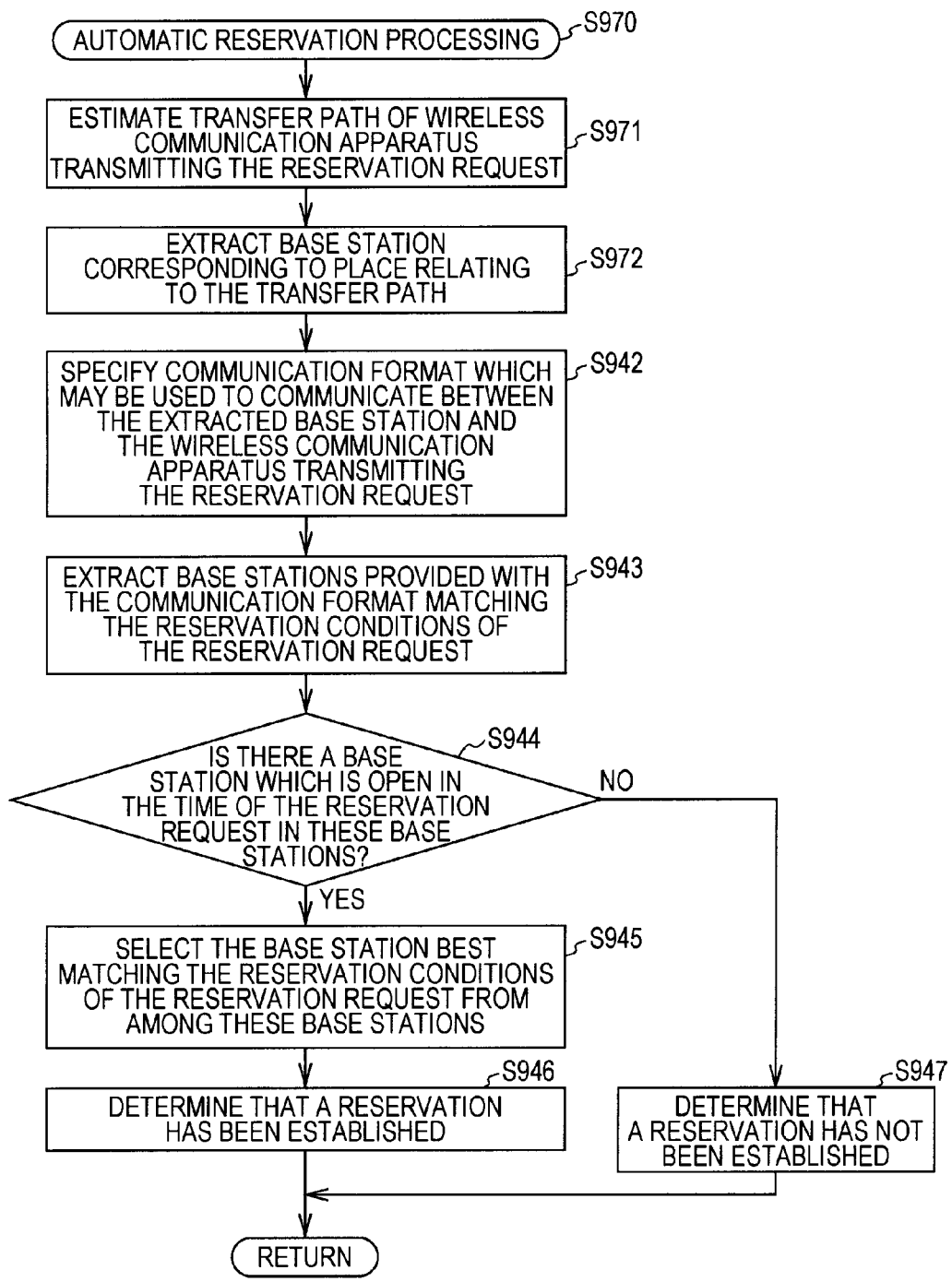
FIG. 22 is a flowchart showing an example of a processing procedure of an automatic reservation process using the information processing apparatus in the second embodiment of the present disclosure.

FIG. 22 is a flowchart showing an example of a processing procedure of a connection rights reservation process using the information processing apparatus 700 in the second embodiment of the present disclosure. Furthermore, the processing procedure is a modification of the processing procedure (step S940) shown in FIG. 17. For this reason, portions which are common to the processing procedure (step S940) shown in FIG. 17 are denoted with the same titles and description thereof will be partially omitted.

First, the terminal path estimation unit 730 estimates the movement path of the wireless communication apparatus which transmitted the reservation request (step S971). Subsequently, the control unit 710 extracts a base station corresponding to the place relating to the movement path calculated by the estimation (step S972). That is, base stations (one or a plurality of base stations) for which a certain range including the movement path calculated from the estimation is included inside the cells are extracted.

In this manner, the control unit 710 may set the specific region including the position where the wireless communication apparatus 300 is present at a specific time band based on the movement path estimation of the wireless communication apparatus 300. Then, the control unit 710 transmits the setting information for setting the connection rights for wirelessly connecting to a predetermined network (for example, the public network 101) in the determined region to the wireless communication apparatus 300.

In this manner, according to the second embodiment of the present disclosure, it is possible to automatically determine the reservation place and the reservation time band and to provide a suitable wireless connection service at a place and timing desired by a user.

3. Third Embodiment

In the first and second embodiments of the present disclosure, examples are shown in which a user who performed a reservation request themselves uses connection rights relating to the reservation. However, it may be assumed that the user who performed a reservation request themselves may no longer be capable of using the connection rights relating to the reservation. In such a case, by conveying the connection rights to another person, it may be assumed to be possible to make effective use of the connection rights. Thus, the third embodiment of the present disclosure shows an example in which connection rights relating to the reservation request are transferred. Further, the configuration of the communication system in the third embodiment of the present disclosure is substantially the same as that of the examples shown in FIG. 2 and the like. For this reason, portions which are common to the first embodiment of the present disclosure are denoted with the same reference numerals and description thereof will be partially omitted.

[Operation Example of Wireless Communication Apparatus]

Figure 23:
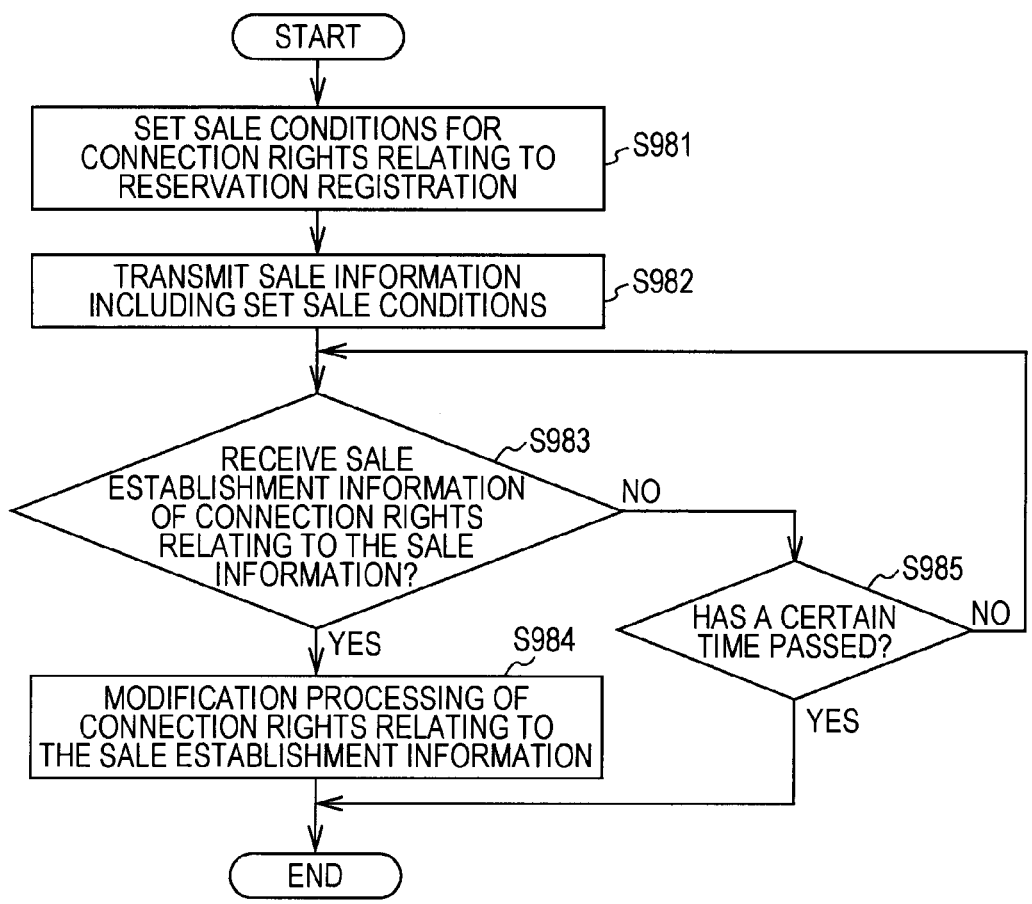
FIG. 23 is a flowchart showing an example of a processing procedure of reservation registration change processing using the wireless communication apparatus in the third embodiment of the present disclosure.

FIG. 23 is a flowchart showing an example of a processing procedure of reservation registration change processing using the wireless communication apparatus 300 in the third embodiment of the present disclosure.

First, the sale conditions of the connection rights relating to the reservation request are set based on a user operation (step S981). For example, the control unit 330 displays a list of connection rights relating to the reservation request on the display unit 350. Then, the connection rights which are the sale target are selected by the user and the sale conditions are set. For example, a sale condition setting screen for setting the sale price and the time band which is the sale target (for example, all or some of the time bands relating to the reservation request) as the sale conditions is displayed on the display unit 350, and the sale conditions are set by operation input in the sale condition setting screen.

Subsequently, the control unit 330 transmits the sale information including the set sale conditions to the information processing apparatus 200 through the first network control apparatus 110 (step S982). When the sale information is transmitted to the information processing apparatus 200, the information processing apparatus 200 provides notification of the sale conditions included in the sale information to another user and receives the purchasing intentions from the other user. Then, when the purchasing intentions are received from the other user for the connection rights relating to the sale information, the information processing apparatus 200 transmits the sale establishment information of the connection rights relating to the sale information to the wireless communication apparatus 300.

Subsequently, it is determined whether or not the sale establishment information of the connection rights relating to the sale information has been received (step S983), and, when the sale establishment information has not been received, monitoring is continued until a certain time has passed (step S985). On the other hand, when the sale establishment information has been received (step S983), the control unit 330 performs a change process on the reservation registration relating to the sale establishment information (step S984). That is, a change process changing the set connection rights based on the sale conditions relating to the sale establishment information is performed.

[Operation Example of Information Processing Apparatus]

Figure 24:
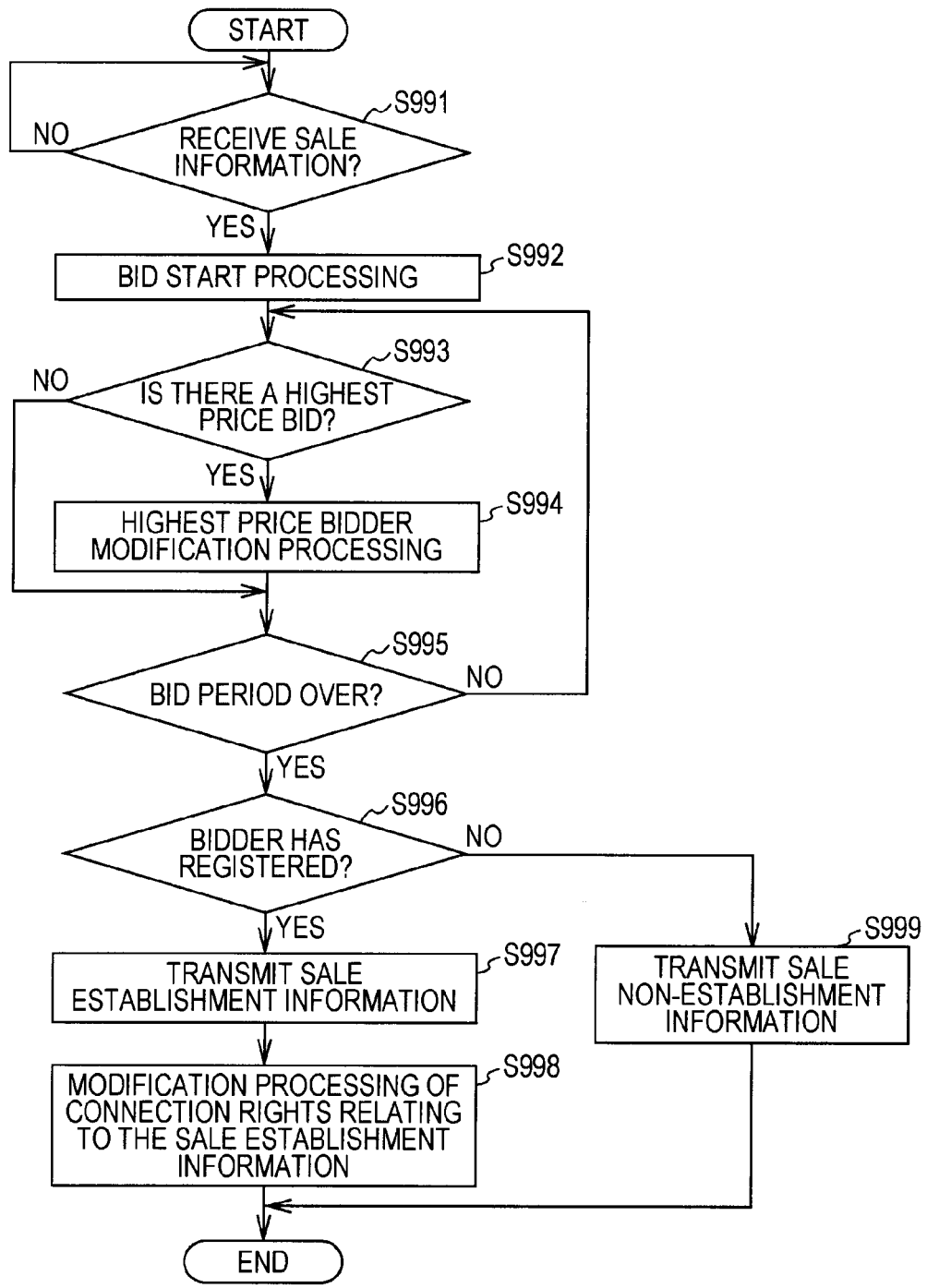
FIG. 24 is a flowchart showing an example of a processing procedure of reservation registration change processing using the information processing apparatus in the third embodiment of the present disclosure.

FIG. 24 is a flowchart showing an example of a processing procedure of reservation registration change processing using the information processing apparatus 200 in the third embodiment of the present disclosure. In the processing procedure, an example is shown of selling connection rights relating to a reservation registration using an auction format.

First, it is determined whether or not the sale information has been received from the wireless communication apparatus (step S991), and, when the sale information has not been received, monitoring is continued. On the other hand, when the sale information has been received (step S991), the bid start processing is performed using an auction format (step S992). For example, the information processing apparatus 200 provides notification of the sale conditions included in the sale information to another user and receives the bidding intentions from the other user.

Subsequently, it is determined whether or not the highest value bid has been received (step S993), and, when the highest value bid has been received, the change process of the highest value bidder is performed (step S994). Subsequently, it is determined whether or not the bid limit has been reached (step S995), and, when the bid limit has not been reached, the process returns to step S993. That is, until the bid limit is reached, the change process of the highest value bidder is performed each time the highest value bid intention is received.

Further, when the bid limit is reached (step S995), it is determined whether or not the bidder is registered (step S996). For example, when the change process of the highest value bidder is performed, at least one bidder is registered.

When the bidder is registered (step S996), the control unit 230 transmits the sale establishment information to the wireless communication apparatus which transmitted the sale information (step S997). Subsequently, the control unit 230 performs a change process of the reservation registration relating to the sale establishment information (step S998). That is, a change process changing the set connection rights based on the sale conditions relating to the sale establishment information is performed. On the other hand, when the bidder is registered (that is, when there is no person intending to bid) (step S996), the control unit 230 transmits the sale non-establishment information to the wireless communication apparatus which transmitted the sale information (step S999).

In this manner, the communication control unit 310 transmits the transfer request (sale information) for transferring the connection rights set in the wireless communication apparatus 300 to other wireless communication apparatuses to the information processing apparatus 200. Further, the control unit 230 performs a transfer process for transferring the connection rights set in the wireless communication apparatus 300 to other wireless communication apparatuses based on the transfer request. In the transfer process, the reservation registration relating to the connection rights is changed according to the transfer.

In this manner, according to the third embodiment of the present disclosure, it is possible to provide a mechanism for a user to buy and sell connection rights. Accordingly, it is possible to make effective use of communication paths of a plurality of communication companies. Further, it is possible to make effective use of wireless communication resources according to demand for places, frequency bands, and time bands.

In addition, the embodiments of the present disclosure describe examples of connection rights based on USIM information as connection rights for connecting to a predetermined network. However, the embodiments of the present disclosure may also be applied to other connection rights for connecting to a predetermined network based on other information (for example, MCIM (Machine Communication Identity Module)).

In addition, the embodiments of the present disclosure describe the information processing apparatus 200 as an example of an integrated configuration. However, the embodiments of the present disclosure may be applied to an information processing system in which the respective units provided in the information processing apparatus are configured by a plurality of apparatuses. Further, the embodiments of the present disclosure may be applied to other mobile type wireless terminal apparatuses (for example, dedicated terminal apparatuses for data communication) and fixed type wireless terminal apparatuses (for example, wireless terminal apparatuses for gathering data of automatic vending machines).

Further, the above-described embodiments show examples for realizing the present disclosure and the matters in the embodiments and the technique specific matters in the range of the present disclosure have a mutually corresponding relationship. Similarly, the technique specific matters in the range of the present disclosure and the matters in the embodiments of the present disclosure having the same titles have a mutually corresponding relationship. However, the present disclosure is not limited to the embodiments and may be realized by variously modifying the embodiments within a range not departing from the scope of the present disclosure.

In addition, the processing procedures described in the above-described embodiments may be grasped as a method having the procedures in a series; moreover, the procedures may also be grasped as a program for causing a computer to perform the series of procedures, or a recording medium storing such a program. As the recording medium, for example, a CD (Compact Disc), an MD (MiniDisc), a DVD (Digital Versatile Disc), a memory card, a Blu-ray Disc (registered trademark) and the like may be used.

Here, the present disclosure may adopt the configurations below.

(1) A wireless communication apparatus including: a communication control unit performing a connection rights reservation request for wirelessly connecting to a predetermined network in a specific region in a specific time band; and a control unit performing control for setting the connection rights based on the setting information according to the reservation request.

(2) The wireless communication apparatus according to (1), in which the connection rights are rights for connecting to the predetermined network by connecting wirelessly to a base station present in the specific region in the specific time band, and the control unit performs a connection process for connecting to the base station based on the set connection rights.

(3) The wireless communication apparatus according to (1) or (2), in which the control unit performs a connection process for connecting to the predetermined network based on the set connection rights only when the wireless communication apparatus is present in the specific region in the specific time band.

(4) The wireless communication apparatus according to any one of (1) to (3), further including an operation receiving unit receiving a designation operation for designating the specific time band and the specific region, in which the communication control unit transmits the reservation request including the received specific time band and the specific region.

(5) The wireless communication apparatus according to any one of (1) to (4), in which the communication control unit transmits the reservation request to an information processing apparatus performing reservation registration of the connection rights according to the reservation request, and the information processing apparatus extracts a base station capable of connecting in the specific time band from among base stations present in the specific region, and transmits the setting information for setting the connection rights for connecting to the predetermined network to the wireless communication apparatus by wirelessly connecting to the extracted base station.

(6) The wireless communication apparatus according to (5), in which the information processing apparatus extracts only a base station for which the number of wireless communication apparatuses, in which the connection rights for connecting to the extracted base station are set, is small with reference to a threshold.

(7) The wireless communication apparatus according to (5) or (6), in which, when a base station capable of connecting in the specific time band from among base stations present in the specific region is not extracted, the information processing apparatus transmits the setting information capable of setting the connection rights according to the reservation request to the wireless communication apparatus only when cancellation of the connection rights set for other wireless communication apparatuses is generated.

(8) The wireless communication apparatus according to any one of (1) to (7), in which the information processing apparatus specifies a position in which the wireless communication apparatus is present in the specific time band based on the movement route prediction of the wireless communication apparatus, determines a region including the specific position as the specific region, and transmits the setting information for setting the connection rights for wirelessly connecting to the predetermined network in the determined specific region to the wireless communication apparatus.

(9) The wireless communication apparatus according to any one of (1) to (8), in which the communication control unit transmits a transfer request for transferring the set connection rights to other wireless communication apparatuses to the information processing apparatus performing reservation registration of the connection rights according to the reservation request, and the information processing apparatus transfers the set connection rights to the other wireless communication apparatus based on the transfer request and changes the reservation registration of the connection rights.

(10) A communication system including: a wireless communication apparatus including a communication control unit transmitting a reservation request of connection rights for wirelessly connecting to a predetermined network in a specific region in a specific time band to an information processing apparatus performing reservation registration of the connection rights according to the reservation request, and a control unit performing control setting the connection rights based on setting information according to the reservation request from the information processing apparatus; and an information processing apparatus extracting a base station capable of connecting in the specific time band from among base stations present in the specific region and transmitting the setting information for setting the connection rights for connecting to the predetermined network to the wireless communication apparatus by wirelessly connecting to the extracted base station.

(11) An information processing method including: controlling communication performing a reservation request for connection rights in order to wirelessly connect to a predetermined network in a specific region in a specific time band; and controlling setting the connection rights based on the setting information according to the reservation request.

The present disclosure contains subject matter related to that disclosed in Japanese Priority Patent Application JP 2011-073851 filed in the Japan Patent Office on Mar. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
a communication control unit performing a connection rights reservation request for wirelessly connecting to a predetermined network in a specific region in a specific time band; and
a control unit performing control for setting the connection rights based on the setting information according to the reservation request,
wherein the predetermined network is selected from a plurality of communication formats capable of communication with a base station; and
wherein the control unit is configured to perform a second connecting rights reservation request for wirelessly connecting to a network related to a second communication operator, by using a connection to a base station based on a first connecting rights for connecting to the first predetermined network related to a first communication operator, in a specific region in a specific time band;
wherein the first communication operator is different from the second communication operator.

2. The wireless communication apparatus according to claim 1, wherein
the connection rights are rights for connecting to the predetermined network by connecting wirelessly to the base station present in the specific region in the specific time band, and
the control unit performs a connection process for connecting to the base station based on the set connection rights.

3. The wireless communication apparatus according to claim 1, wherein the control unit performs a connection process for connecting to the predetermined network based on the set connection rights only when the communication apparatus is present in the specific region in the specific time band.

4. The wireless communication apparatus according to claim 1, further comprising an operation receiving unit receiving a designation operation for designating the specific time band and the specific region,
wherein the communication control unit transmits the reservation request including the received specific time band and the specific region.

5. The wireless communication apparatus according to claim 1, wherein
the communication control unit transmits the reservation request to an information processing apparatus performing reservation registration of the connection rights according to the reservation request, and
the information processing apparatus extracts a base station capable of connecting in the specific time band from among base stations present in the specific region, and transmits the setting information for setting the connection rights for connecting to the predetermined network to the wireless communication apparatus by wirelessly connecting to the extracted base station.

6. The wireless communication apparatus according to claim 5, wherein the information processing apparatus extracts only a base station for which the number of wireless communication apparatuses, in which the connection rights for connecting to the extracted base station are set, is small with reference to a threshold.

7. The wireless communication apparatus according to claim 5, wherein, when a base station capable of connecting in the specific time band from among base stations present in the specific region is not extracted, the information processing apparatus transmits the setting information capable of setting the connection rights according to the reservation request to the wireless communication apparatus only when cancellation of the connection rights set for other wireless communication apparatuses is generated.

8. The wireless communication apparatus according to claim 1, wherein an information processing apparatus specifies a position in which the wireless communication apparatus is present in the specific time band based on the movement route prediction of the wireless communication apparatus, determines a region including the specific position as the specific region, and transmits the setting information for setting the connection rights for wirelessly connecting to the predetermined network in the determined specific region to the wireless communication apparatus.

9. The wireless communication apparatus according to claim 1, wherein the communication control unit transmits a transfer request for transferring the set connection rights to other wireless communication apparatuses to an information processing apparatus performing reservation registration of the connection rights according to the reservation request, and
the information processing apparatus transfers the set connection rights to the other wireless communication apparatus based on the transfer request and changes the reservation registration of the connection rights.

10. The wireless communication apparatus according to claim 1, wherein the plurality of communication formats comprise more than one of LT (Long Term Evolution), LTE-A (LTE-advanced), IEEE 802.11a/b/n/g, W-CDMA (Wideband Code Division Multiple Access), HSPA+ (High Speed Packet Access Plus), GPRS (General Packet Radio Service), or WiMAX.

11. The wireless communication apparatus according to claim 1, wherein the control unit is configured to set universal subscriber identity module (USIM) information for a first communication operator to the USIM information for a second communication operator.

12. A communication system comprising:
a wireless communication apparatus including a communication control unit transmitting a reservation request of connection rights for wirelessly connecting to a predetermined network in a specific region in a specific time band to an information processing apparatus performing reservation registration of the connection rights according to the reservation request, and a control unit performing control setting the connection rights based on setting information according to the reservation request from the information processing apparatus, wherein the predetermined network is selected from a plurality of communication formats capable of communication with a base station; and
wherein the control unit is configured to perform a second connecting rights reservation request for wirelessly connecting to a network related to a second communication operator, by using a connection to a base station based on a first connecting rights for connecting to the first predetermined network related to a first communication operator, in a specific region in a specific time band;
wherein the first communication operator is different from the second communication operator; and
an information processing apparatus extracting a base station capable of connecting in a specific time band from among base stations present in the specific region and transmitting the setting information for setting the connection rights for connecting to the predetermined network to the wireless communication apparatus by wirelessly connecting to the extracted base station.

13. The communication system according to claim 12, wherein the plurality of communication formats comprise more than one of LT (Long Term Evolution), LTE-A (LTE-advanced), IEEE 802.11a/b/n/g, W-CDMA (Wideband Code Division Multiple Access), HSPA+ (High Speed Packet Access Plus), GPRS (General Packet Radio Service), or WiMAX.

14. An information processing method comprising:
controlling communication performing a reservation request for connection rights in order to wirelessly connect to a predetermined network in a specific region in a specific time band; and
controlling setting the connection rights based on the setting information according to the reservation request; and
performing a second connecting rights reservation request for wirelessly connecting to a network related to a second communication operator, by using a connection to a base station based on a first connecting rights for connecting to the first predetermined network related to a first communication operator, in a specific region in a specific time band;

wherein the first communication operator is different from the second communication operator.

15. The information ion processing method according to claim 14, wherein the plurality of communication formats comprise more than one of LT (Long Term Evolution), LTE-A (LTE-advanced), IEEE 802.11a/b/n/g, W-CDMA (Wideband Code Division Multiple Access), HSPA+ (High Speed Packet Access Plus), GPRS (General Packet Radio Service), or WiMAX.

* * * * *